(12) United States Patent  (10) Patent No.: US 12,179,053 B2
O'Donnell et al.  (45) Date of Patent: Dec. 31, 2024

(54) FIRE TRAINING PROPS AND METHODS FOR USING FIRE TRAINING PROPS

(71) Applicant: FLASHPOINT FIRE EQUIPMENT, INC., Sherwood Park (CA)

(72) Inventors: Ryan O'Donnell, Troy, NY (US); Michael Todd Nixon, Sherwood Park (CA)

(73) Assignee: Flashpoint Fire Equipment, Inc., Sherwood Park (CA)

(*) Notice: Subject to any disclaimer, the term of this patent is extended or adjusted under 35 U.S.C. 154(b) by 815 days.

(21) Appl. No.: 17/301,969

(22) Filed: Apr. 20, 2021

(65) Prior Publication Data

US 2021/0346744 A1 Nov. 11, 2021

Related U.S. Application Data

(60) Provisional application No. 63/021,288, filed on May 7, 2020.

(51) Int. Cl.
| A62C 99/00 | (2010.01) |
| G09B 19/00 | (2006.01) |
| G09B 25/04 | (2006.01) |

(52) U.S. Cl.
CPC .......... *A62C 99/0081* (2013.01); *G09B 19/00* (2013.01); *G09B 25/04* (2013.01)

(58) Field of Classification Search
CPC ...... G09B 19/00; G09B 25/04; A62C 99/0081

(Continued)

(56) References Cited

U.S. PATENT DOCUMENTS 3,594,922 A * 7/1971 Ellis ....................... G09B 25/04
434/365
5,226,818 A * 7/1993 Feiock ............... A62C 99/0081
434/226

(Continued)

FOREIGN PATENT DOCUMENTS

CA 2934095 C 12/2017
EP 2269697 A1 1/2011

OTHER PUBLICATIONS

International Search Report from corresponding PCT application PCT/IB2021/053463, mailed on Aug. 5, 2021, 3 pages.

(Continued)

*Primary Examiner* — Joseph B Baldori
(74) *Attorney, Agent, or Firm* — Tech Valley Patent, LLC; John Pietrangelo

(57) ABSTRACT

Fire training props and methods of using fire training props are provided. The props may be suitable for table-top training and include an enclosure; at least one internal panel positioned within the enclosure and defining a plurality of internal volumes within the enclosure; a transparent top panel positioned on the top of the enclosure; at least one side aperture and a side aperture cover in at least one of the sides of the enclosure; and at least one panel aperture having an aperture cover in the at least one internal panel. When a source of visible fluid, for example, smoke, is introduced to the enclosure, a flow of the visible fluid in the enclosure can be monitored by a user through the transparent top panel. Aspects of the invention are uniquely adapted for training firefighters and other first responders on the dynamics of fire, for example, in an engaged structure.

20 Claims, 17 Drawing Sheets

(58) Field of Classification Search
USPC .......................................................... 434/226
See application file for complete search history.

(56) References Cited

U.S. PATENT DOCUMENTS

| | | | | |
|---|---|---|---|---|
| 5,518,403 A * | 5/1996 | Luftig | ................ | A62C 99/0081 |
| | | | | 434/226 |
| 5,927,990 A * | 7/1999 | Welch | .................... | G09B 19/00 |
| | | | | 434/226 |
| 6,179,620 B1 * | 1/2001 | Schmid | ................. | G09B 25/04 |
| | | | | 434/226 |
| 7,008,230 B2 | 3/2006 | Hoglund | | |
| 9,573,009 B2 * | 2/2017 | Bloemker | .......... | A62C 99/0081 |
| 9,707,424 B2 | 7/2017 | Bloemker | | |
| 10,573,195 B1 | 2/2020 | Egelin, Jr. et al. | | |
| 11,524,195 B2 * | 12/2022 | Bloemker | ............... | G09B 25/04 |
| 2005/0233289 A1 * | 10/2005 | Hoglund | ................ | G09B 19/00 |
| | | | | 434/226 |
| 2008/0090214 A1 * | 4/2008 | D'Anneo | ............... | G09B 19/00 |
| | | | | 434/226 |
| 2015/0132728 A1 | 5/2015 | Harding et al. | | |
| 2015/0283416 A1 | 10/2015 | Bloemker | | |
| 2019/0118016 A1 | 4/2019 | Severijns et al. | | |
| 2023/0290265 A1 * | 9/2023 | Savoie | ................... | G09B 19/00 |

OTHER PUBLICATIONS

Written Opinion from corresponding PCT application PCT/IB2021/053463, mailed on Aug. 5, 2021, 5 pages.

"Fire Behavior Demo @ National Fire Academy" YouTube Video: National Fire Academy in Emmitsburg, MD https://youtu.be/JWdGgvdgbSo?feature=shared, May 18, 2016.

"BullEx launches FlashFire training system," Firefighting in Canada, Jan. 28, 013, 1 page.

Hartin, Ed, "What is Compartment Fire Behavior Training?," International Association of Fire and Rescue Services, Mar. 21, 2018, 9 pages.

Palmer Dollhouse Fire Prop, Los Angeles Fire Dept., Facebook posting, 2019, 2 pages.

* cited by examiner

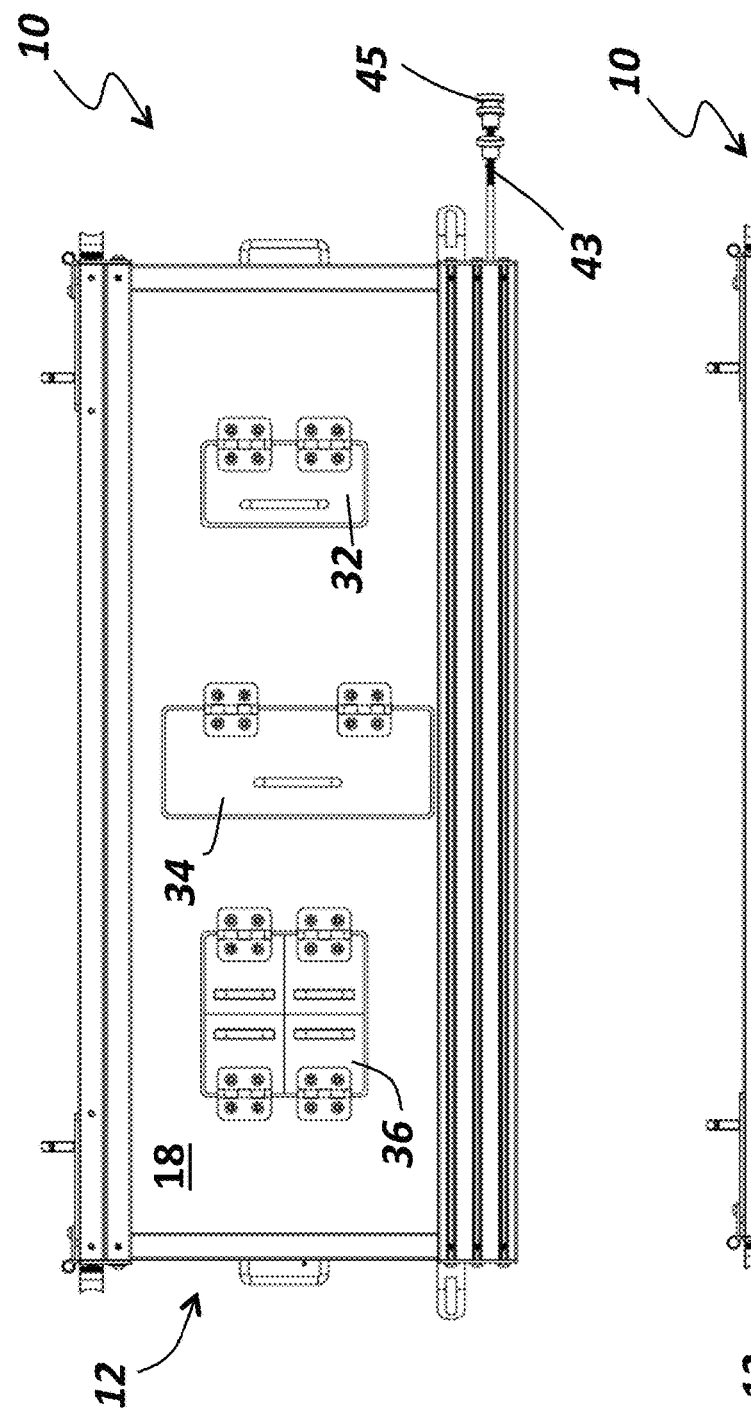
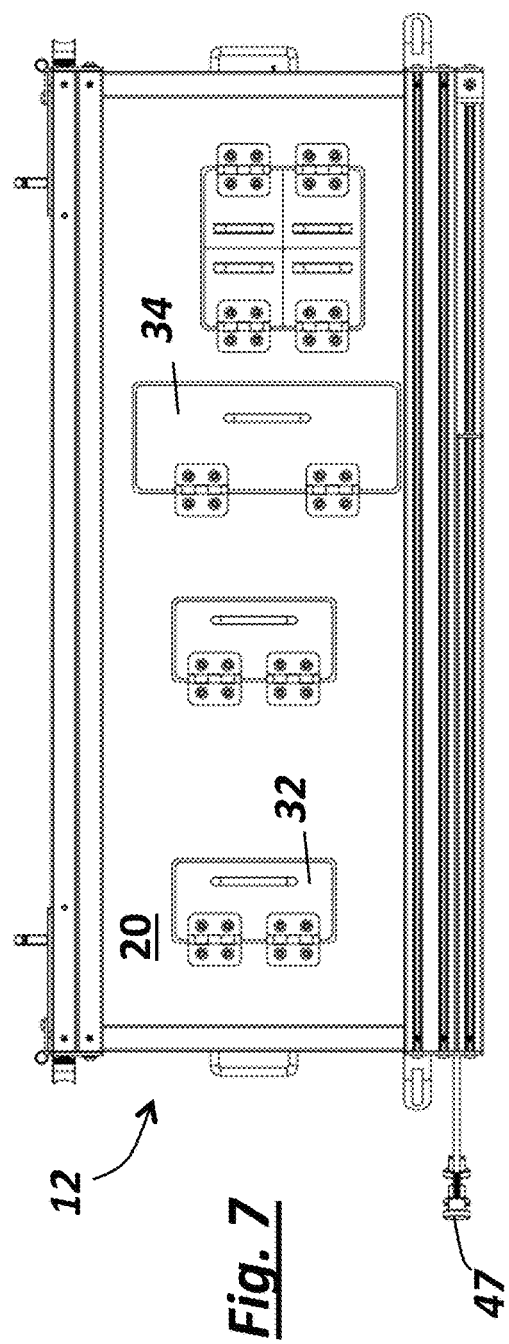

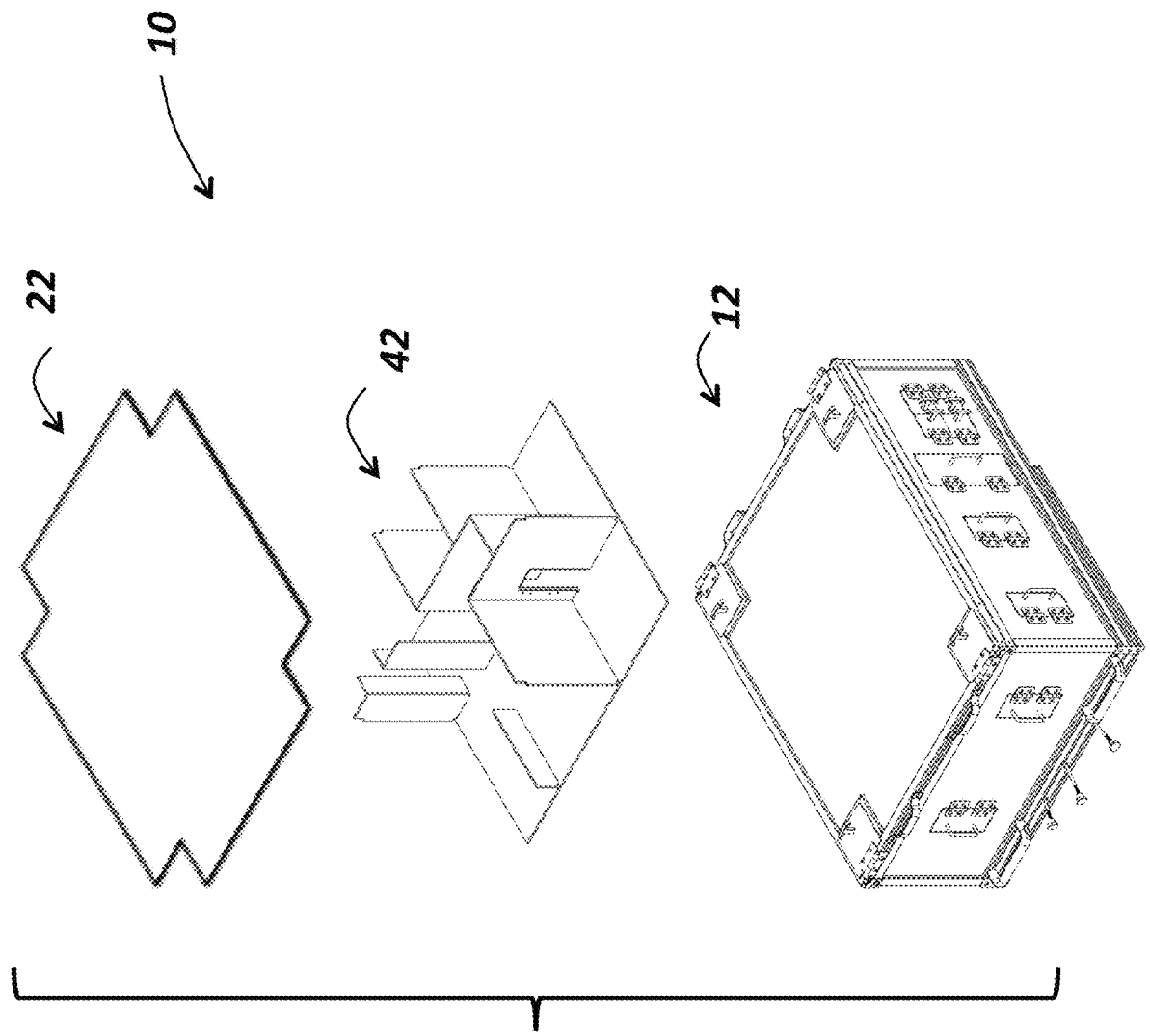

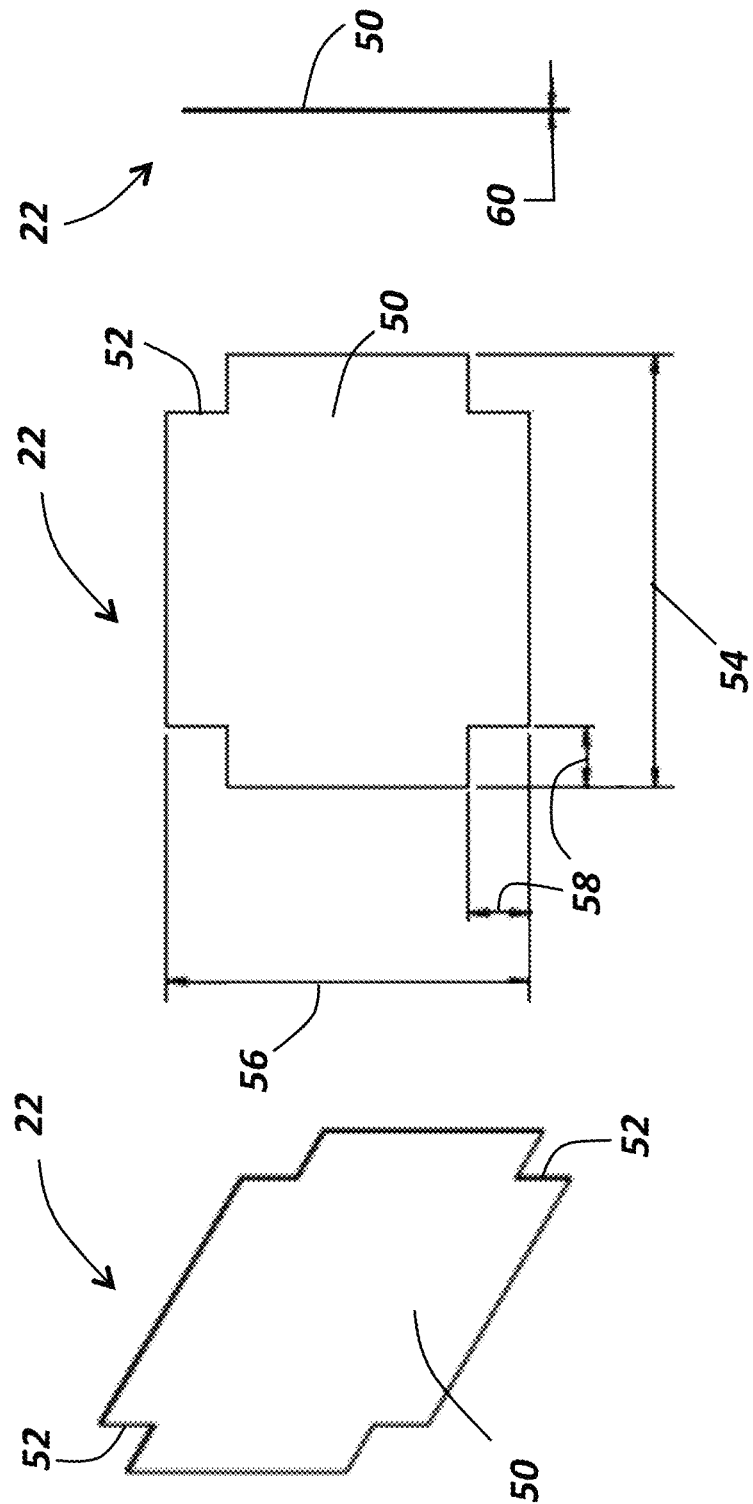

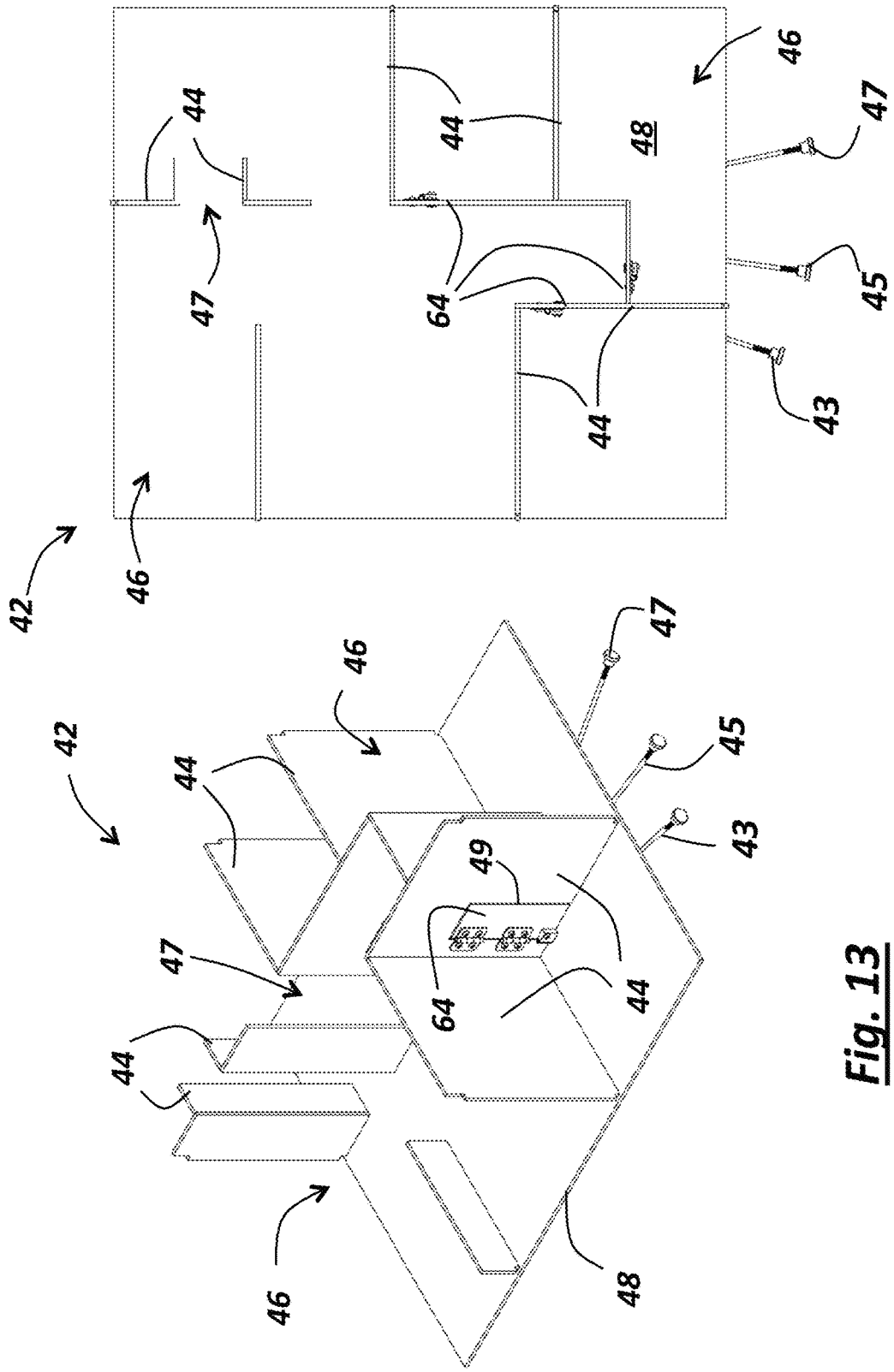

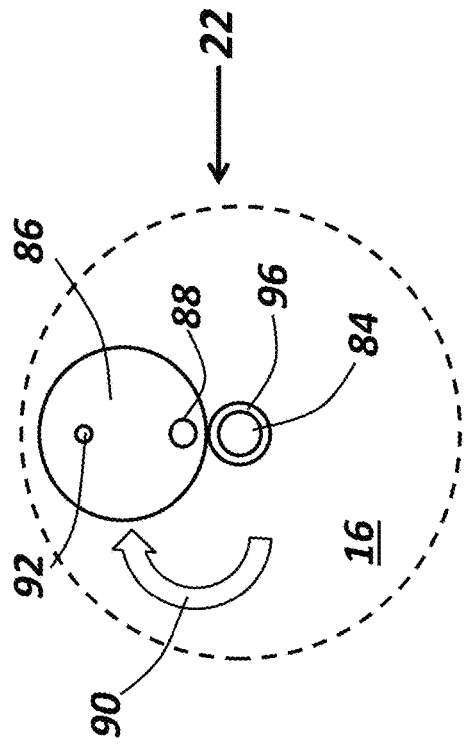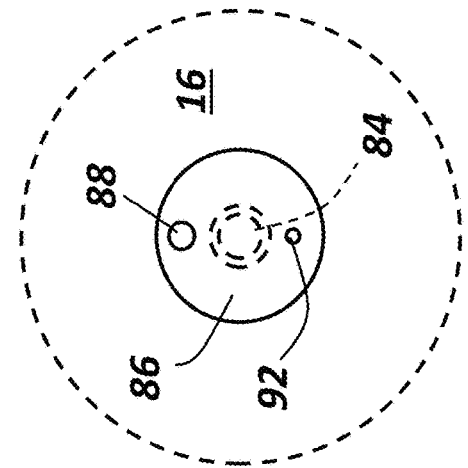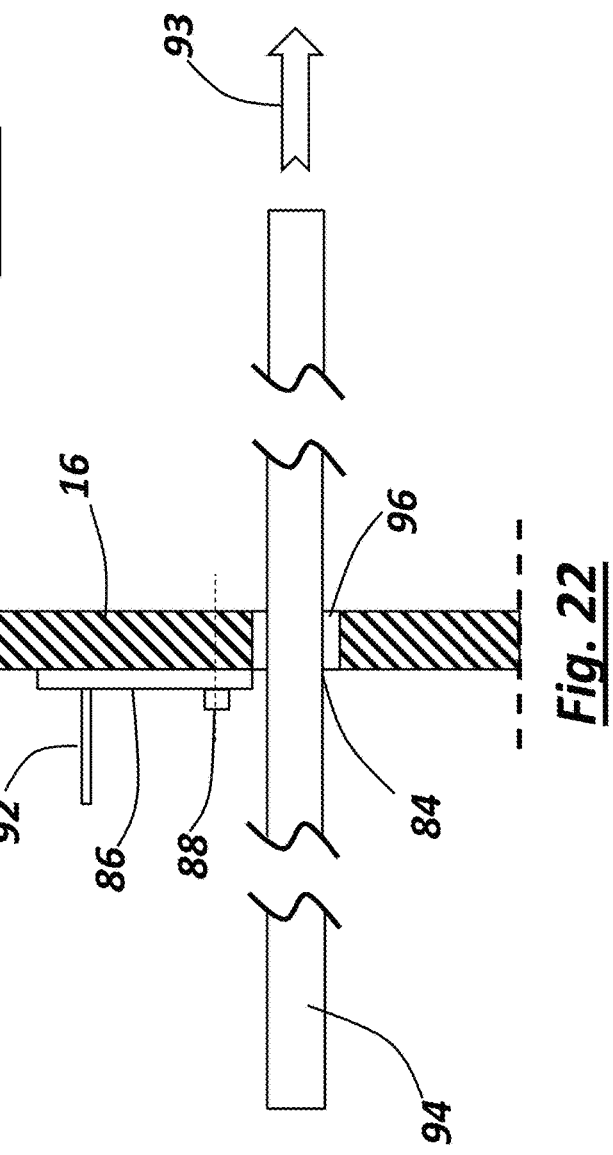

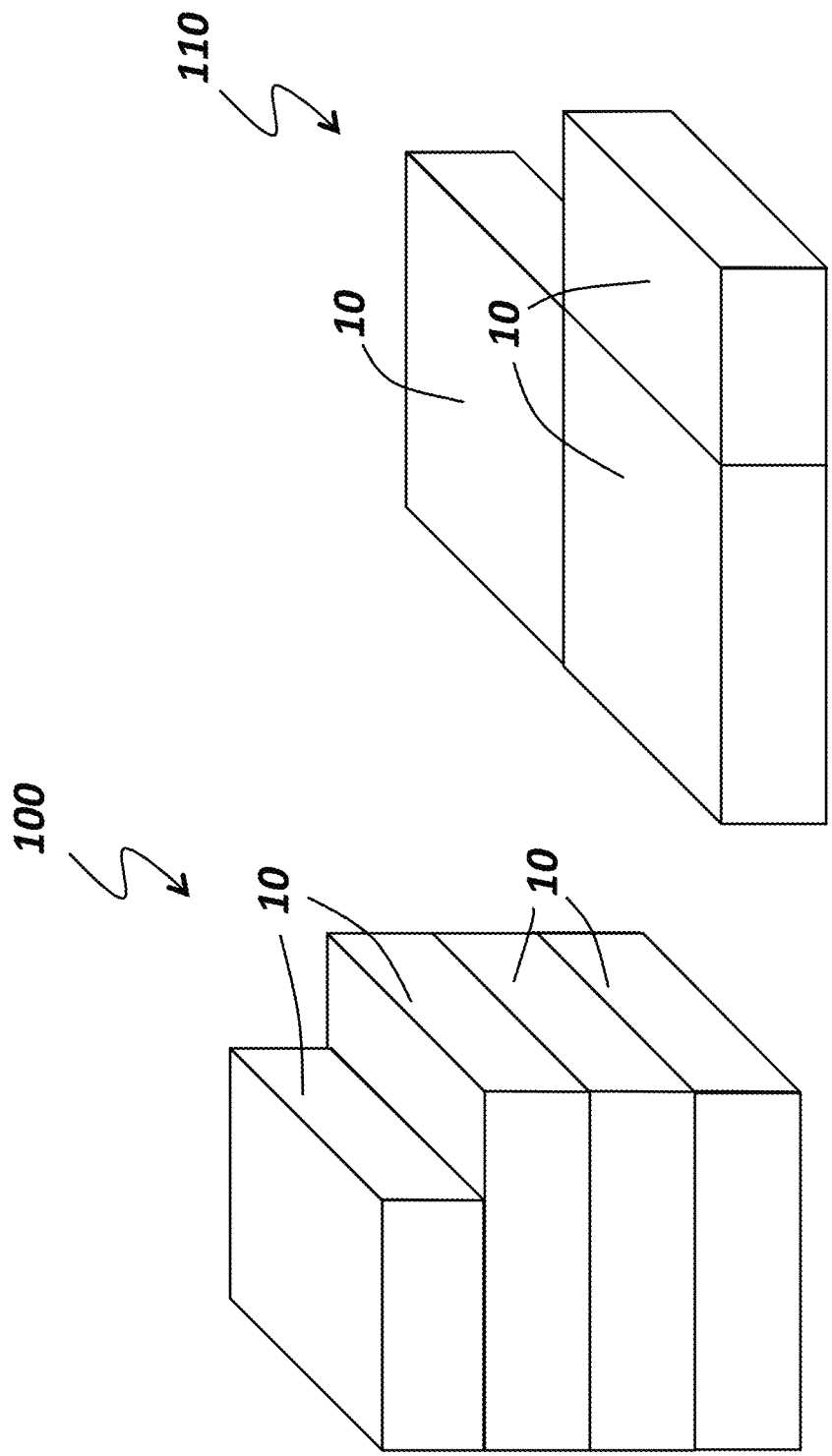

FIRE TRAINING PROPS AND METHODS FOR USING FIRE TRAINING PROPS

CROSS-REFERENCE TO RELATED APPLICATION

This application claims priority from pending U.S. Provisional Patent Application 63/021,288 filed on May 7, 2020, the disclosure of which is included by reference herein in its entirety.

BACKGROUND OF THE INVENTION

Technical Field

The present invention generally relates to firefighter or first responder fire training props and their methods of use. More particularly, the present invention relates to fire training props comprising scale models of buildings and their floor plans having a transparent top and/or sides through which fire progress can be observed. Internal doors and exterior apertures can be opened or closed and the effect on a live fire can be observed through the transparent top and/or sides.

Description of Related Art

In order to train firefighters and other first responders about the dynamic nature of the progression of fire, flame, and smoke through a structure, firefighter training "props" are often used. Fire training props can be full-size structures of actual buildings that are ignited, and the progress of the fire and smoke can be monitored and varied, for example, by opening or penetrating a wall or ceiling and observing the resulting characteristics of a fire.

Since the cost of building full scale structures can be expensive and the subsequent destruction of the full scale structure can also be dangerous, scale models of structures are often used, for example, table-top scale models or "props." The dynamic character of smoke and flame is scalable so that scale models can be very effective in observing the behavior of fire that reflects actual full size fires. In addition, scale models made of fire-resistant materials can be re-used repeatedly.

Typical table-top training props, for example, those marketed by Flashpoint Fire Equipment, Inc. of Sherwood Park, Alberta, Canada, comprise scaled, metal frame enclosures having glass walls through which fire behavior can be observed. These structures are typically multiple floor structures having a single transparent side through which fire and smoke can be observed in and between floors of the scale model. Though these floor-to-floor fire training props have proven to provide an effective and re-usable means of training firefighters and other fire responders on the dynamic behavior of fires, these devices are limited and there is a need in the art to improve fire training props and their method of use to enhance training in a fire's dynamic behavior, especially in response to varying air flows.

SUMMARY OF THE INVENTION

Aspects of the present invention address the limitations of the prior art fire training props by providing training props and methods of training that enhance the opportunity to train firefighters and other first responders on the dynamic nature of fire. Aspects of the present invention provide flame resistant, table-top training props that model building floor layouts and have transparent tops or "ceilings" that allow the trainee to see the actual progress of a live fire through the floor plan, for example, through the door ways and hall ways, as the fire progresses. Aspects of the invention provide mechanisms for manipulating both external apertures (for example, doors and windows) and internal apertures (for example, doors) where the effect of an open exterior door or window or an open interior door can be observed from above and/or through the sides of the structure using the prop.

One embodiment of the invention is table-top fire training prop, the training prop comprising or including: an enclosure having an open top, a closed bottom, and sides; at least one internal panel positioned within the enclosure and defining a plurality of internal volumes within the enclosure; a transparent top panel positioned on the open top of the enclosure; at least one side aperture and a side aperture cover in at least one of the sides of the enclosure; and at least one panel aperture having an aperture cover in the at least one internal panel; wherein, when a source of visible fluid, such as, fire and smoke, is introduced to the enclosure, a flow of the visible fluid in the enclosure can be monitored by a user through the transparent top panel.

In one aspect, the at least one internal panel positioned within the enclosure and defining the plurality of internal volumes within the enclosure may comprise a partition assembly having a plurality of panels positioned within the enclosure and defining the plurality of internal volumes within the enclosure.

In another aspect, the training prop may further comprise at least one control rod operatively connected to the at least one panel aperture cover, such as, a door, in the at least one internal panel. In one aspect, two or more control rods may be operatively connected to two or more doors within the enclosure.

In one aspect, the training prop may further include at least one aperture having an aperture cover mounted in the open top of the enclosure.

In one aspect, the source of visible fluid may be a source of visible gas or a source of visible liquid. For example, the source of visible gas may be a source of fire and smoke.

In another aspect, the training prop may be a scale model of a floor plan of a structure, wherein the plurality of internal volumes, or rooms, within the enclosure comprise a plurality of horizontally adjacent internal volumes, or rooms, of the floor plan.

Another embodiment of the invention is a training method comprising or including: providing a training prop comprising: an enclosure having an open top, a closed bottom, and sides; a transparent top panel positioned on the open top of the enclosure; at least one internal wall positioned within the enclosure and defining a plurality of internal volumes within the enclosure; and at least one wall aperture having an aperture cover in the at least one internal wall; introducing a source of visible fluid, such as, fire and smoke, to the enclosure; and allowing a trainee to monitor a flow of the visible fluid in the enclosure through the transparent top panel.

In one aspect, the method further includes manipulating a position of the aperture cover or door of the at least one wall aperture, for example, opening or closing the door.

In one aspect, the training prop further comprises at least one control rod operatively connected to the aperture cover or door of at least one wall aperture, and manipulating the position of the aperture cover or door of the at least one wall aperture may be practiced by manipulating the at least one control rod.

In one aspect, the method may further include introducing a flow of gas, for example, oxygen-containing gas, to the training prop, for example, through a conduit or tube inserted in a hole in a side of the training prop.

In another aspect, the at least one internal wall positioned within the enclosure may be a first partition assembly defining a first plurality of volumes, and wherein the method may further include replacing the first partition assembly with a second partition assembly defining a second plurality of volumes, different from the first plurality of volumes. In addition, the method may include allowing the trainee to monitor a flow of the visible fluid in the enclosure with the second partition assembly and then compare the flow of visible fluid with the second partition assembly with the flow of visible fluid with the first partition assembly.

A further embodiment of the invention is a table-top fire training prop comprising or including: an enclosure having an open top, a closed bottom, and sides; a partition assembly positioned within the enclosure, the partition assembly having a plurality of partitions defining a plurality of internal volumes within the enclosure; a transparent top panel positioned on the open top of the enclosure; at least one side aperture and a side aperture cover in at least one of the sides of the enclosure; at least one door pivotally mounted to one of the partitions of the partition assembly; and at least one control rod operatively connected to the at least one door and adapted to open and close the at least one door; wherein, when a source of flame is introduced to the enclosure, a flow of the flame in the enclosure can be monitored by a user through the transparent top panel and the flow of flame can be manipulated by the user by opening or closing the at least one door with the at least one control rod.

These and other aspects, features, and advantages of this invention will become apparent from the following detailed description of the various aspects of the invention taken in conjunction with the accompanying drawings

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

FIG. 6 is a left-side elevation view of the training property shown in FIG. 1.

FIG. 7 is a right-side elevation view of a training property shown in FIG. 1.

FIG. 9 is an exploded front perspective view of the training property shown in FIG. 1.

FIG. 10 is a perspective view of the top panel shown in FIG. 9.

FIG. 11 is a top plan view of the top panel shown in FIG. 10.

FIG. 12 is a side view of the top panel shown in FIG. 11.

FIG. 13 is a perspective view of the partition assembly shown in FIG. 9.

FIG. 14 is a top plan view of the partition assembly shown in FIG. 13.

FIG. 20 is a detailed view of the rear wall shown in FIG. 5 as identified by Detail 20 shown in FIG. 5 with the cover shown in a closed position.

FIG. 21 is detailed view similar to FIG. 20 where the cover has been rotatably displaced from the position of cover shown in FIG. 20.

FIG. 22 is a cross sectional view of a wall having a hole as shown in FIG. 21 as viewed along view line 22 in FIG. 21.

FIG. 25 is a perspective view of a prop assembly having multiple props as disclosed herein stacked one on top of the other according to one aspect of the invention.

FIG. 26 is a perspective view of a prop assembly having multiple props as disclosed herein assembled in a horizontal array, with props assembled to adjacent to other props, according to one aspect of the invention.

DETAILED DESCRIPTION OF THE INVENTION

Embodiments of the present invention provide devices or props and methods for using devices or props that facilitate and enhance the training of firefighters and/or other first responders in the dynamics of fire and smoke propagation in a structure. In the following disclosure aspects of the invention may be described with respect to training on the behavior of fire and smoke within the prop, it is envisioned that aspects of the invention may be used for training in the propagation and dynamics of any fluid, a gas or a liquid, within an enclosure. For example, one aspect of the invention may be used for training in the distribution of a liquid, such as, water or an aqueous chemical, and the like, while another aspect of the invention may be used for training in the distribution of a gas, such as, propane, methane, a natural gas, a gaseous chemical, and the like.

In one aspect of the invention, trainees may observe the flow of fluids, typically, gases, into and out of the prop to enhance their understanding of the effects of these fluid flows upon the fire and, it is hoped, to mitigate the undesirable effects upon the fire and its propagation in actual fires. For example, by employing aspects of the invention, trainees may observe the air flows into the prop (that is, intake currents) and/or the exhaust flows out of the prop, for example, air, smoke, flames, and pyrolyzates (that is, products of pyrolysis, such as, unburned fuel) to better understand how such flows can affect fire dynamics in actual structure fires. It is envisioned that such insights can assist the firefighter in possibly predicting how, when, and where the fire is likely to progress through the structure. This is believed significant since, during actual fire fighting in and around a fire-engulfed structure, for example, it is typically difficult, if not impossible, for the firefighter to observe where air (that is, an oxygen-containing fire accelerant) enters into a burning building and undesirably "feeds" the fire. With the enhanced understanding of the flow path, flow rate, and/or dynamics of such air flows that can be provided by aspects of the invention, firefighters can then better "visualize" the fire behavior in actual fires and thus implement measures to mitigate or prevent the introduction of air to the fire, for example, by not penetrating and outside wall or roof, and thus enhance fire suppression.

According to one aspect, the intake currents into the prop and exhaust flows out of the prop may be varied by, for example, manipulating exterior and/or interior inlets and/or outlets, such as, those representing doors and windows, and having the trainee observe the effects of such manipulation upon the fire and its progression and/or suppression.

Figure 1:
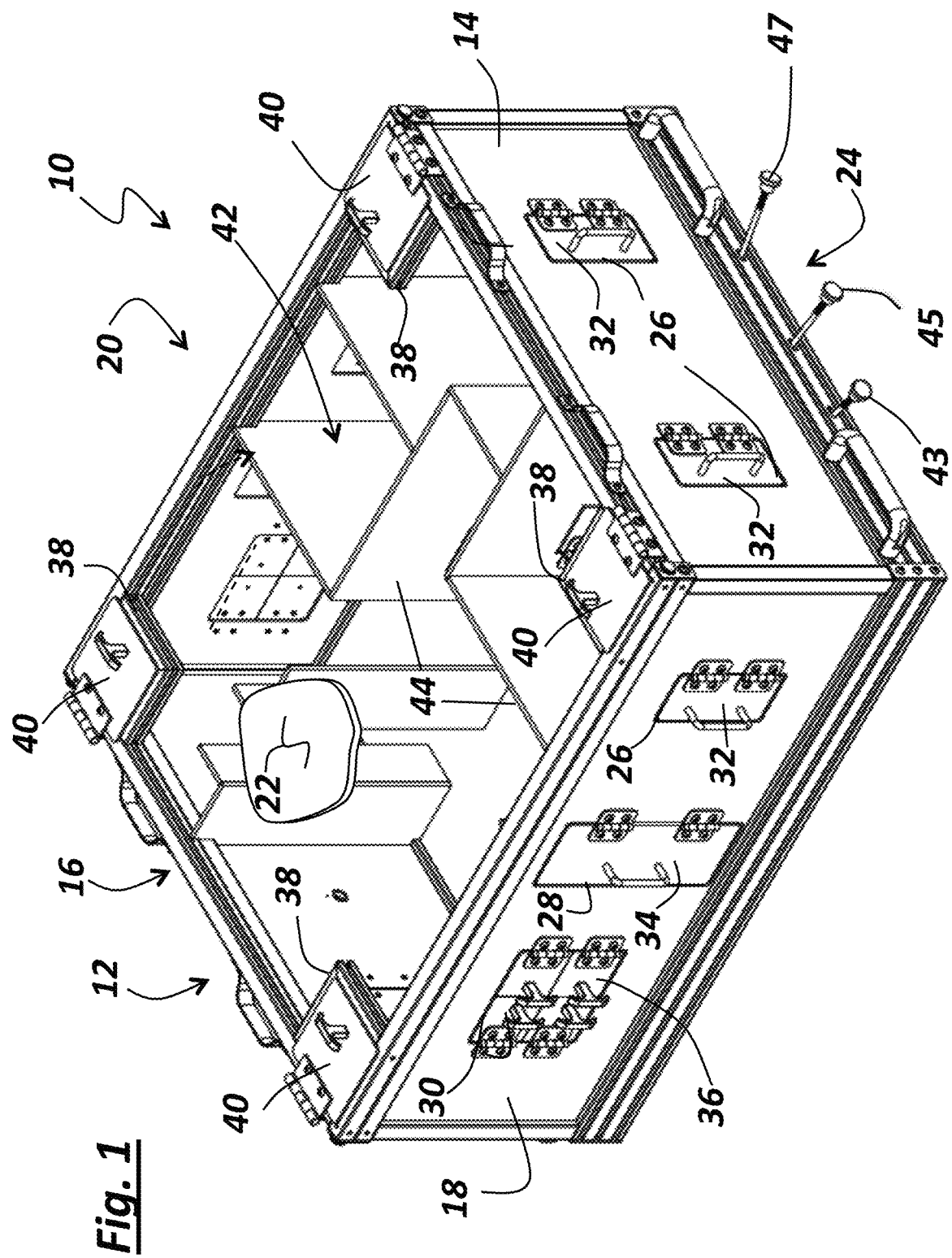
FIG. 1 is a front perspective view of a training property according to one aspect of the invention.
Figure 2:
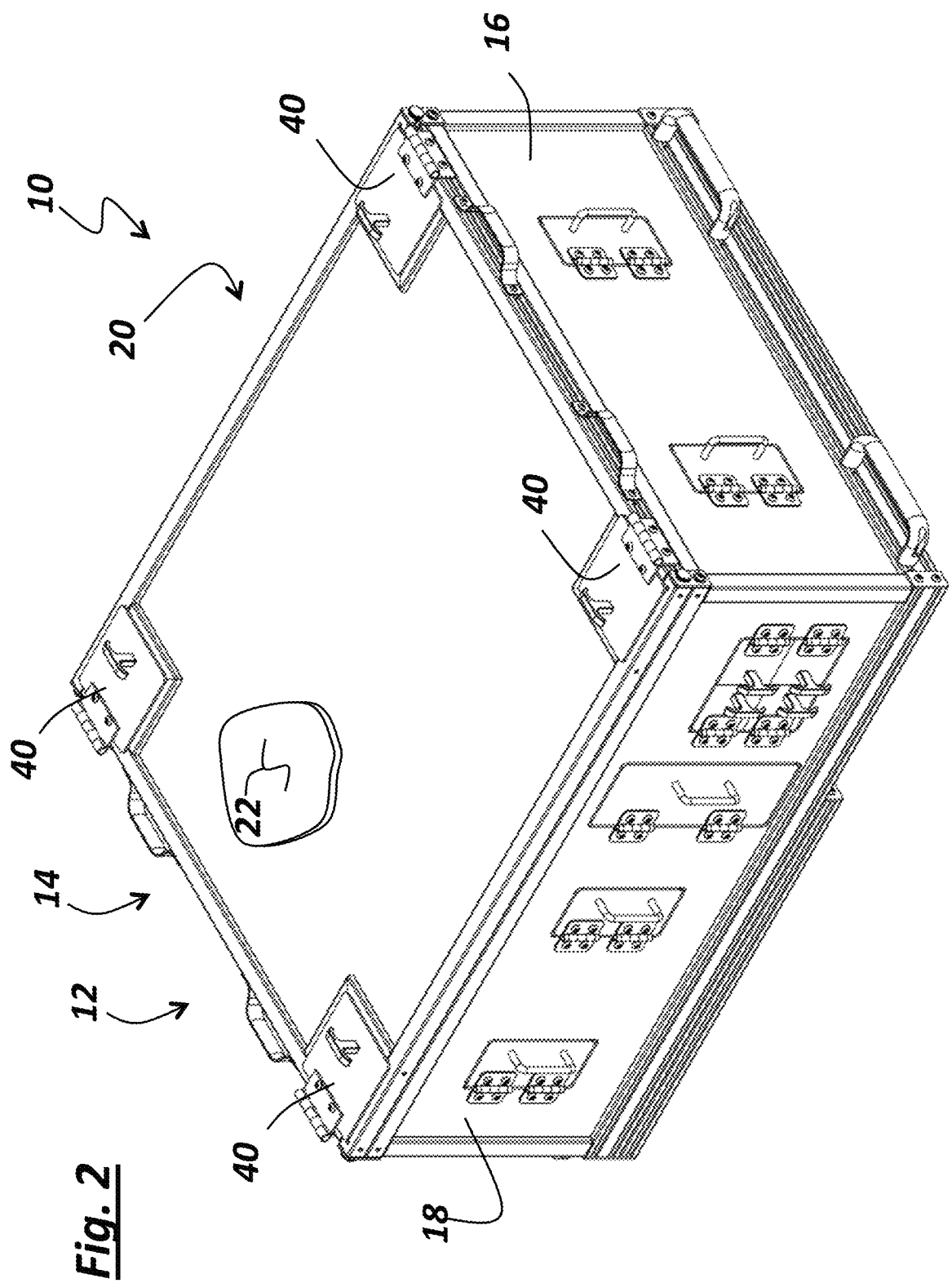
FIG. 2 is a rear perspective view of the training property shown in FIG. 1.
Figure 3:
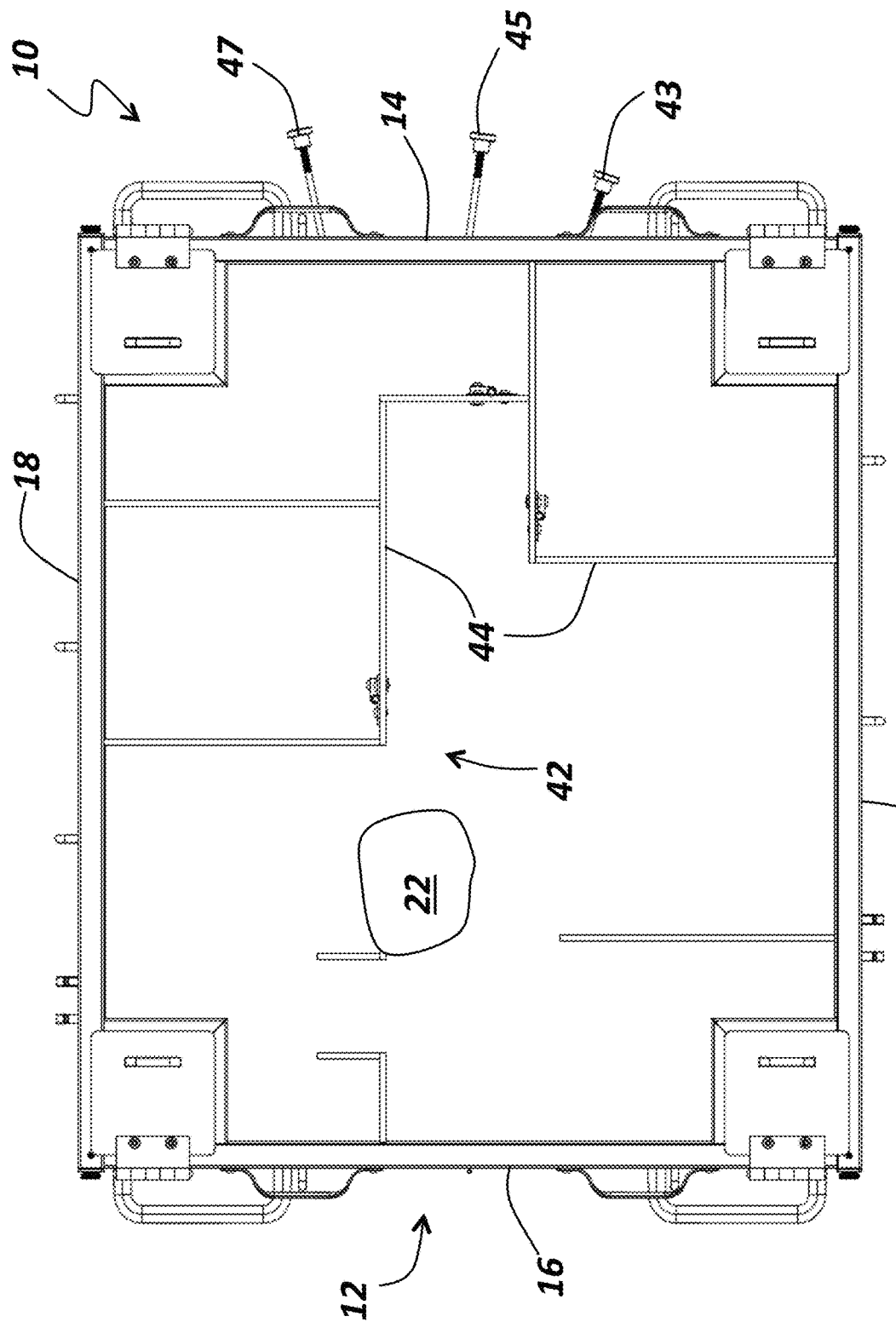
FIG. 3 is a top plan view of the training property shown in FIG. 1.
Figure 4:
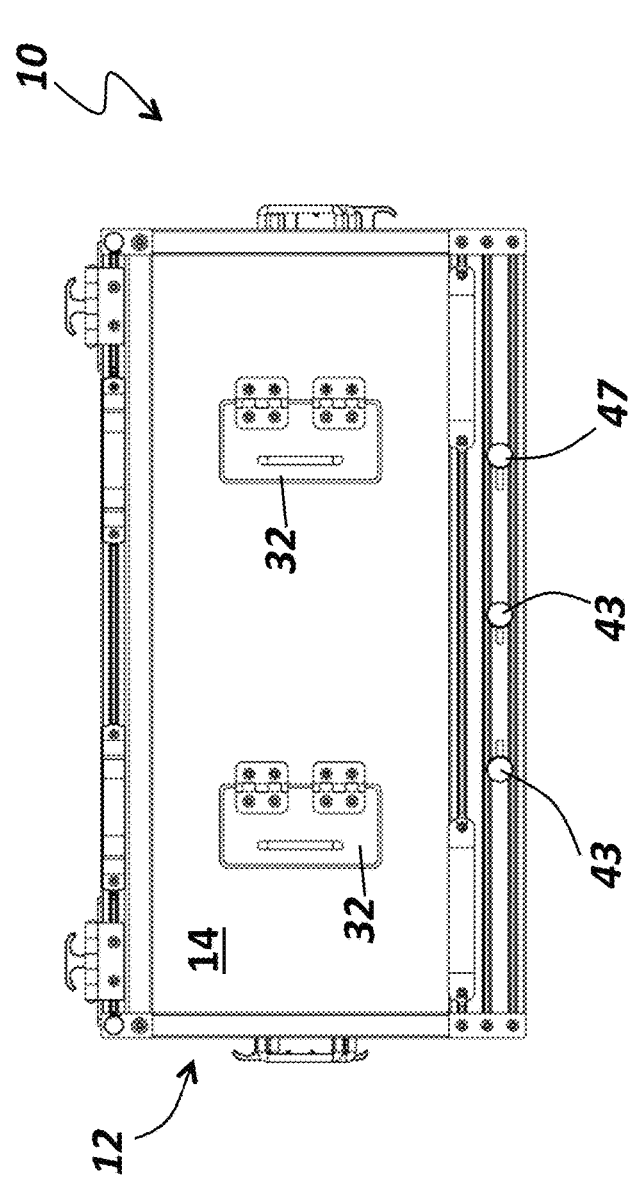
FIG. 4 is a front elevation view of the training property shown in FIG. 1.
Figure 5:
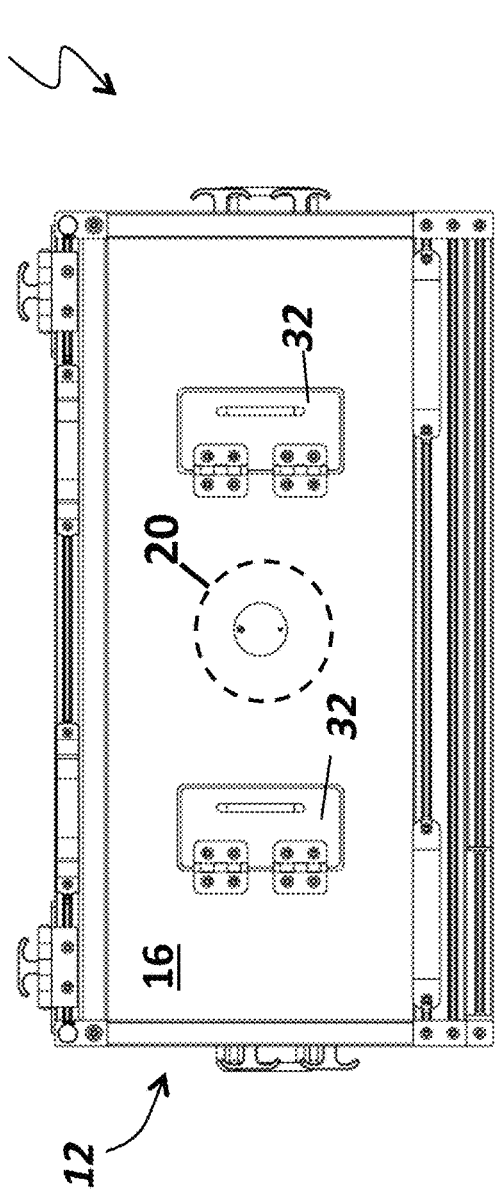
FIG. 5 is a rear elevation view of the training property shown in FIG. 1.
Figure 8:
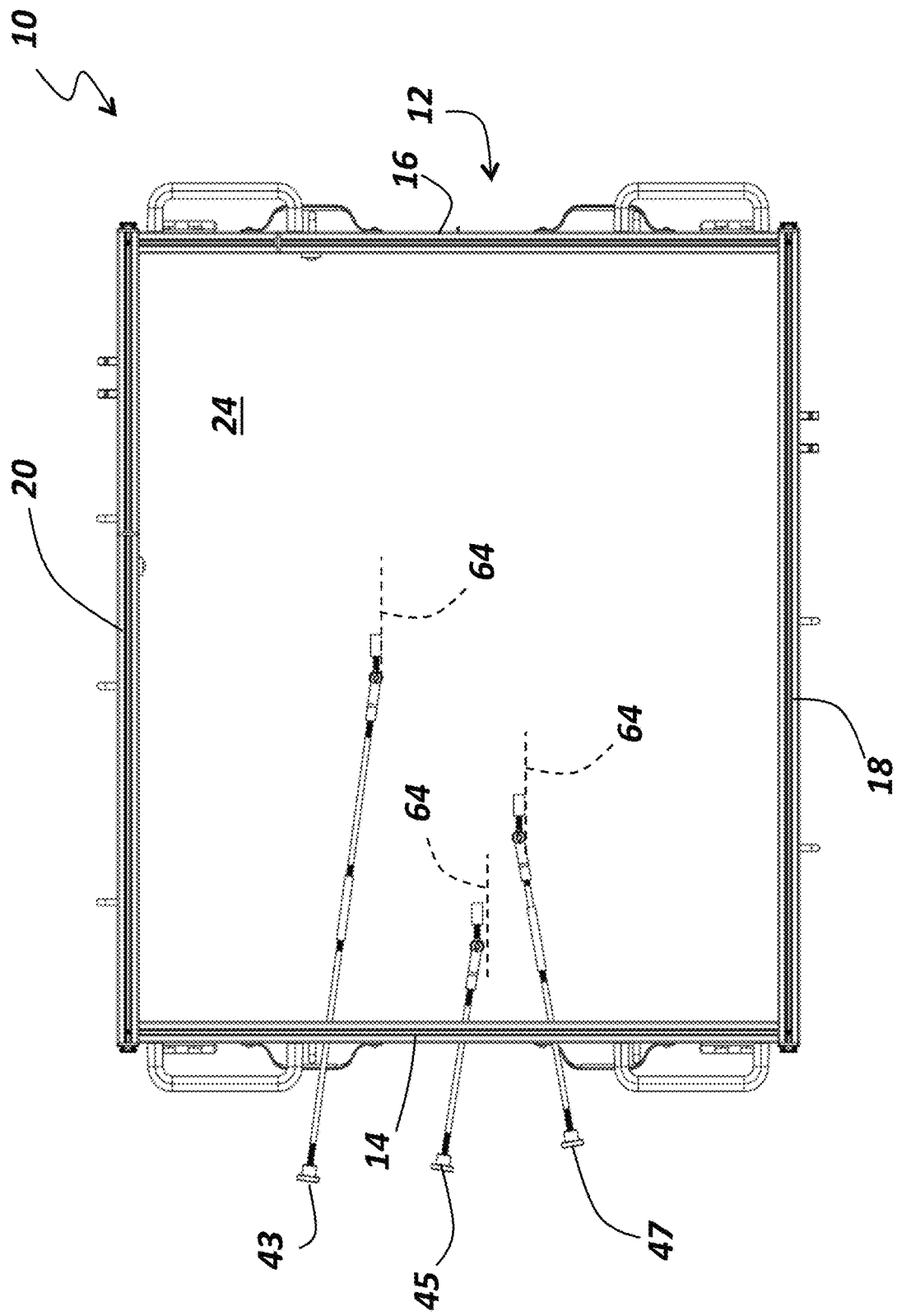
FIG. 8 is a bottom view of the training property shown in FIG. 1.

FIG. 1 is a front perspective view of a table-top training prop 10 according to one aspect of the invention. FIG. 2 is a rear perspective view of the training prop 10 shown in FIG. 1. FIG. 3 is a top plan view of the training prop 10 shown in FIG. 1; FIG. 4 is a front elevation view of the training prop 10 shown in FIG. 1; FIG. 5 is a rear elevation view of the training prop shown in FIG. 1; FIG. 6 is a left-side elevation view of the training prop 10 shown in FIG. 1; FIG. 7 is a right-side elevation view of the training prop 10 shown in FIG. 1; and FIG. 8 is a bottom view of the training prop 10 shown in FIG. 1.

Though aspects of the invention may be referred to as "table-top" devices, it is envisioned that depending upon the size of the structure being modeled, the size of training prop 10 may exceed the capacity of conventional tabletops. According to aspects of the invention, the expression "table top" is used to mean that the devices disclosed herein are characterized as being scale models of full size structures. Accordingly, it is envisioned that the scale, that is, the geometric scale or proportionality, of prop 10 disclosed herein may vary, for example, from a scale range of 1:10 to 1:30, but prop 10 may typically have a scale of 1:15 or 1:20.

In one aspect, the scale of prop 10 disclosed herein may be a function of the fire behavior and/or fire dynamics, that is, where prop 10 is scaled to provide a more realistic fire behavior that more closely mimics what is observed in actual full-scale structures. In one aspect, the size, shape, and/or spacing of apertures or ports of prop 10 may be scaled to more accurately provide realistic or actual fluid flows into and/or out of prop 10. For example, it is recognized that fluid flows into and/or out of prop 10 may not be scalable in a manner similar to the geometric scaling of the overall structure of prop 10, for example, convection flows may not be scalable. Accordingly, in one aspect, ports or apertures (for example, windows or doors) of prop 10 may be larger, for example, wider, than ports or apertures scaled directly from the overall scale of prop 10.

As shown in FIGS. 1 through 8, training prop 10 comprises an enclosure 12 having a front wall (or side) 14, a rear wall (or side) 16, a left-side wall (or side) 18, a right-side wall (or side) 20, a top panel 22 (only a representative portion of which is shown in FIGS. 1, 2 and 3), and a bottom panel (or bottom) 24. Front wall 14, rear wall 16, right side wall 18, and left side wall 20 may have one or more openings or apertures 26, 28, and, 30 having hinged aperture covers 32, 34, and 36, respectively. Top panel 22 may also have one or more openings or apertures 38 having hinged opening or aperture covers 40. According to aspects of the invention one or more enclosures 12 may be provided and function as scale models of at least a portion of structure, for example, a floor in a residential building or a floor of home or a floor of a residential, commercial, or industrial building.

As shown most clearly in FIGS. 1, 2, and 3, according to aspects of the invention prop 10 includes a partition assembly 42 having at least one but typical a plurality of internal partitions 44 functioning as scale models of walls, for example, interconnected partitions 44 functioning as scale models of walls defining internal volumes, cavities, or rooms 46 within the scale model represented by prop 10. In one aspect partitions 44 may be referred to as walls or panels.

According to aspects of the invention, at least top panel 22 of prop 10 and/or a side panel 14, 16, 18 and/or 20 may be transparent, or at least translucent, to allow a user to view partition assembly 42 threw top panel 22 and/or through side panels 14, 16, 18 and/or 20. In one aspect, partition assembly 42 includes internal partitions, panels, or walls 44 and the internal volumes 46, such as, rooms, closets, halls, and/or corridors defined by partitions or walls 44, for example, when a source of smoke or flame (not shown) is introduced to prop 10. In one aspect, at least one internal partition or wall 44 may be transparent or translucent. In one aspect, one or more sensors, for instance, may detect conditions within prop 10 indirectly, for example, where the top panel 22, and side panels 14, 16, 18, and 20 may not be transparent. It is envisioned that in some instances, for example, when prop 10 comprises a multi-floored structure, direct visual observation of fluid flows within prop 10 may be difficult or impossible to obtain. For example, in one aspect, one or more conditions within prop 10 may be detected without visual observation, for instance, by using thermocouples, oxygen sensors, infrared sensors, and/or fluid flow detectors, and the like.

As also shown in FIGS. 1 through 8, in one aspect, prop 10 includes one or more rods or control rods 43, 45, and 47 that extend out of enclosure 12, for example, from below the bottom panel 24, and are operatively connected to movable aperture covers or "doors" 64 (shown in phantom) positioned within enclosure 12. According to one aspect of the invention, one or more of the control rods 43, 45, and 47 may be manipulated by a user, for example, a trainer, to open or close one or more internal doors or apertures within prop 10, as desired, to effect a desired air flow or change in air flow in prop 10. For example, one or more of rods 43, 45, and 47 may be used to open or close, or at least partially open or partially close, an internal door 64 to demonstrate the effect of a change in air flow supply to a source of fire in enclosure 12. Control rods 43, 45, and 47 may by manually manipulated or automatedly manipulated, for example, with stepper motors or displacement transducer controlled by a controller.

FIG. 9 is an exploded front perspective view of training prop 10 shown in FIGS. 1 through 8. As shown in FIG. 9, training prop 10 includes enclosure 12, one or more partition assemblies 42 positioned within enclosure 12, and one or more top panels 22 mounted upon enclosure 12 and over the one or more partition assemblies 42.

FIG. 10 is a perspective view of the top panel 22 shown in FIG. 9. FIG. 11 is a top plan view of top panel 22 shown in FIG. 10, and FIG. 12 is a side view of top panel 22 shown in FIG. 11. As shown, top panel 22 may typically comprise a plate or sheet 50 shaped to mount to the top of enclosure 12, for example, a generally rectangular or square plate sized and shaped to mount to a correspondingly sized and shaped enclosure 12. Though in one aspect plate 50 may be square or rectangular, as shown in FIGS. 10 and 11, plate 50 may include one or more cut-outs or voids 52 sized, shaped, and positioned to engage corresponding structures on enclosure 12. For example, cut-outs 52 may be sized, shaped, and positioned on plate 50 to engage openings 38 and/or opening covers 40 of enclosure 12 as shown in FIGS. 1 through 3. It is envisioned that plate 50 and cut-outs 52 of top panel 22 may assume other geometric shapes depending upon the shape of enclosure 12 and the shape of openings 38, for example, plate 50 and/or cut-outs 52 may take any polygonal shape, such as, a triangular, a hexagonal, or an octagonal shape, or a circular shape or an elliptical shape, among others.

As shown in FIG. 11, plate 50 of top panel 22 may have a length 54 and a width 56 each ranging from 12 inches to 120 inches, for example, depending how large a structure is being modeled by prop 10 or the scale of prop 10. However, plate 50 may typically be 24 to 48 inches in length 54, for example, 36 inches in length 54; and plate 50 may be 18 to 42 inches in width 56, for example, 30 inches in width 56. Also, cut-outs 52 in plate 50 may have a width and/or length 58 ranging from 1 inch to 12 inches, but are typically about 5 inches in width 58. As shown in FIG. 12, plate 50 of top panel 22 may have a thickness 60 ranging from 0.0625 inches to 2 inches, for example, depending how large a structure is being modeled. However, plate 50 may typically have a thickness 60 ranging from 0.125 inches to 0.5 inches, for example, a thickness 60 of 0.1875 inches.

As disclosed herein, top panel 22 is typically at least translucent, but preferably transparent, to allow an operator or trainee to be able to view the contents of prop 10, for example, to view the progress of smoke and/or flame through the rooms and passages of prop 10. Accordingly, in one aspect, plate 50 of top panel 22 may be made of at least a translucent material, and preferably a transparent material. For example, in one aspect, plate 50 may be made from a glass, for example, a substantially clear or transparent glass, though tinted, colored, or coated glasses may be used. In addition, the material of plate 50 may preferably be able to withstand and/or tolerate the heat and/or temperatures expected to be experienced while prop 10 is in use. Accordingly, in one aspect, plate 50 may be made of a heat-resistant transparent glass, for example a transparent glass-ceramic, such as, the heat-resistant, glass-ceramic marketed under the name "Pyroceram" by various providers. In one aspect, the Pyroceram used for plate 50 may be provided by Corning Glass, or its equivalent.

FIG. 13 is a perspective view of the partition assembly 42 shown in FIG. 9, and FIG. 14 is a top plan view of the partition assembly 42 shown in FIG. 13. As shown, in one aspect, partition assembly 42 comprises at least one, but typically, a plurality of partitions or walls 44, which, with or without the sides of enclosure 12, define a plurality of volumes or rooms 46. Partition assembly 42 is sized and shaped to be received by enclosure 12. In one aspect, partitions 44 may be mounted to a one or more base plates 48, though in other aspects no base plate 48 may be provided.

According to one aspect, walls 44 of partition assembly 42 may be located and shaped to define openings or passageways 47, or may include openings or apertures 49, for example, defining windows or doors. As shown in FIGS. 13 and 14, openings 49 may be provided with movable covers or obstructions 64, for example, representing hinged doors or windows.

According to aspects of the invention partitions 44, base plates 48, and doors 64 may be made of any appropriate material, for example, a flammable material, such as, wood, fiber board, or particle board; however, in other aspects, partitions 44 and base plates 48 may preferably be made from a non-flammable material, thus allowing repeated re-use. In one aspect, partitions 44, base plates 48, and doors 64 may be made from a heat resistant metal or a heat resistant plastic. The heat resistant metal may be steel, a stainless steel, an aluminum, or titanium. For example, in one aspect, partitions 44, base plates 48, and doors 64 may be made from aluminum sheet, for example, 6105-T5 series aluminum or its equivalent.

Partitions 44, base plate 48, and doors 64 may have a thickness ranging from 0.00625 to 0.50 inches, depending upon the size and/or loading of prop 10. However, typically, partitions 44 and base plates 48 may have a thickness ranging from 0.125 inches to 0.375 inches, such as, a thickness of 0.25 inches.

Though FIGS. 13 and 14 show one partition assembly 42 having a one arrangement of partitions 44 and apertures 49 that may be used with aspects of the invention, it is envisioned that two or more, or a plurality of, different partition assemblies 42 may be provided. For example, a plurality of different partition assemblies 42 may be provided where each of the different partition assemblies 42 may have a different arrangement of partitions 44 and apertures 49, for example, representing different floor plans that may be used for training with prop 10. In one aspect, at least 10 different partition assemblies may be provided; however, it is envisioned that the number of different partition assemblies 42 may be limitless.

In one aspect, for example, a plurality of different partition assemblies 42 may be used sequentially and the resulting fire or smoke behavior observed and compared to optimize the floor plan to limit fire and smoke progress through the floor plan.

According to one aspect of the invention, the construction of walls 44 in partition assembly 42 and the assembly of partisan assembly 42 into enclosure 12 allows for thermal expansion and/or contraction of the components during use. In one aspect, this construction is referred to as "floating panel construction." Accordingly, in one aspect, walls 44 and partition assembly 42 are designed and dimensioned with sufficient tolerances or clearances between elements, for example, in the horizontal planes (for example, the X-Y plane) and in the vertical direction (for example, the Z direction) to allow for thermal expansion and contraction without distortion or the creation of undesirable gaps or openings in the structure.

Figure 15:
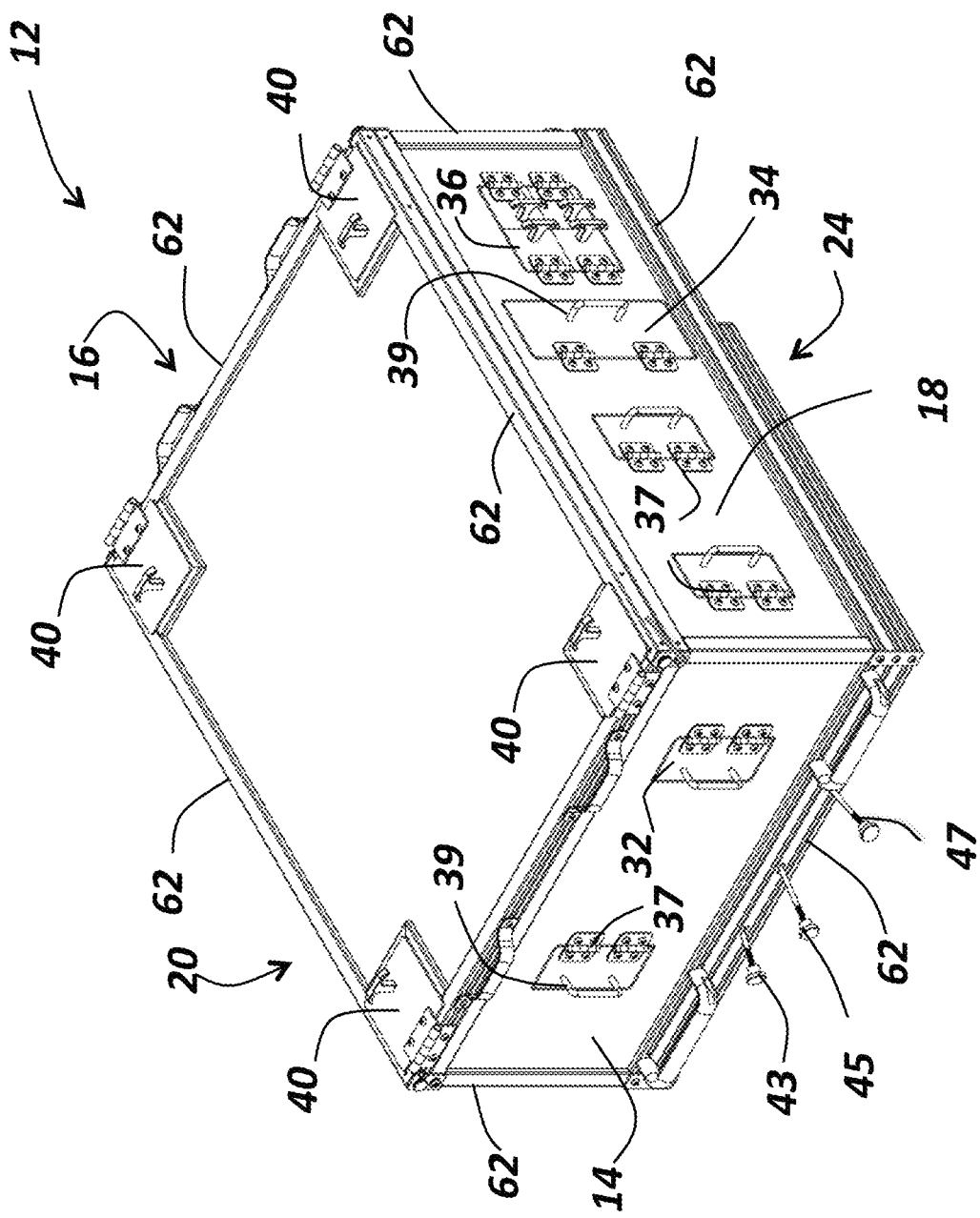
FIG. 15 is a perspective view of the enclosure shown in FIG. 9.
Figure 16:
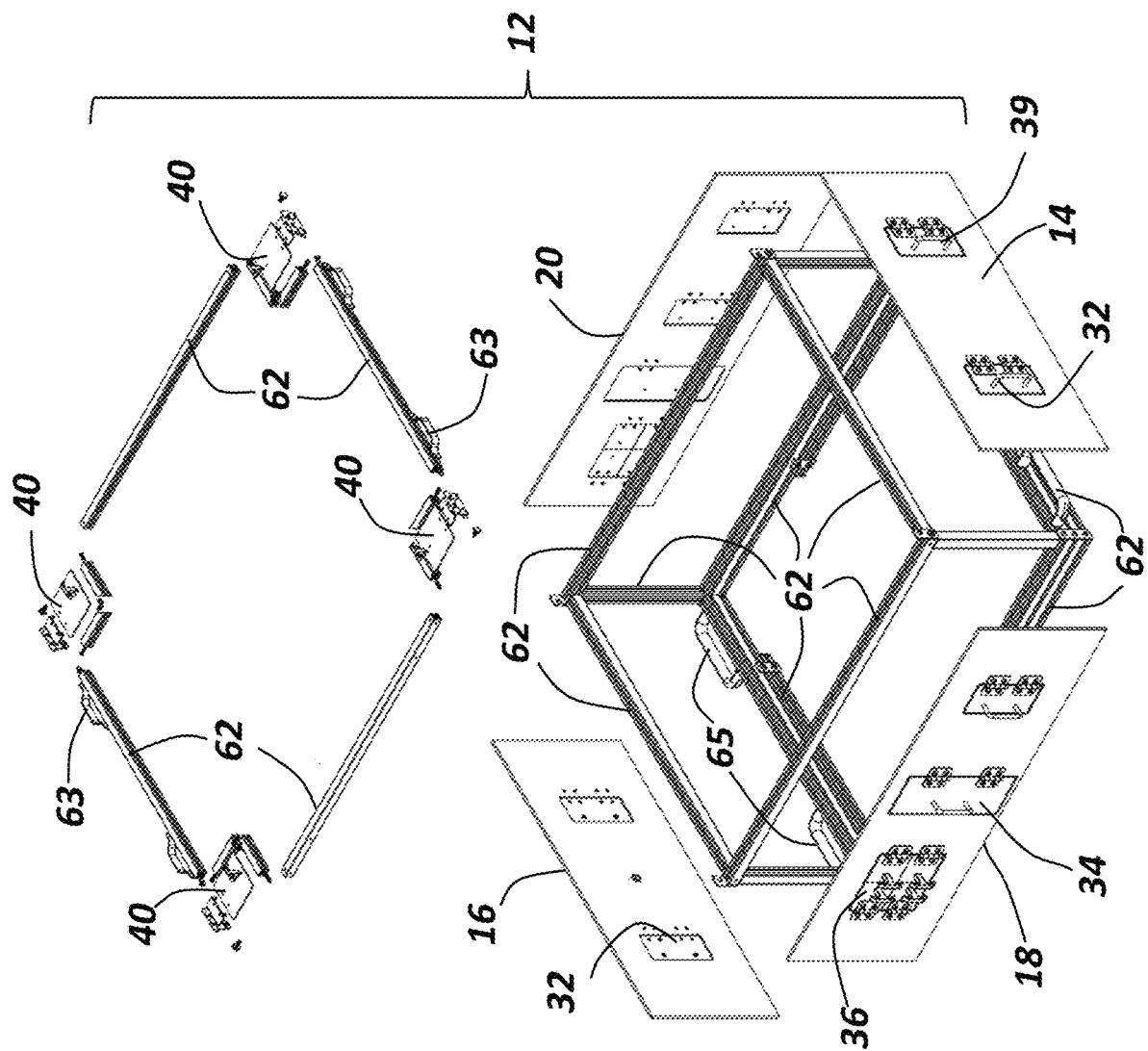
FIG. 16 is an exploded perspective view of the enclosure shown in FIG. 15.

FIG. 15 is a perspective view of enclosure 12 shown in FIG. 9. FIG. 16 is an exploded perspective view of enclosure 12 shown in FIG. 15. As shown in FIGS. 15 and 16, in one aspect, enclosure 12 may be fabricated from elongated horizontal and vertical support members 62 sized and adapted to support front wall 14, rear wall 16, right side wall 18, left side wall 20, and bottom panel 24.

In one aspect, elongated horizontal and vertical support members 62 may be any elongated structural element adapted to support the walls and bottom panel of enclosure 12, for example, channels, beams, angels, rods, or bars or the like. These structural elements may be assembled with mechanical fasteners, welding, and/or an adhesive. Elongated horizontal and vertical support members 62 may be provided in appropriate shapes and sizes depending upon the size and loading of enclosure 12. For example, in one aspect, elongated horizontal and vertical support members 62 may have lengths from 3 inches to 10 feet, but typically, have lengths from 24 inches to 48 inches, for example, 30 to 36 inches. Elongated horizontal and vertical support members 62 may have widths or heights ranging from 1 inch to 12 inches, but typically, have widths or heights ranging from 2 inches to 6 inches, for example, 2 to 3 inches.

In one aspect, elongated horizontal and vertical support members 62 may be extrusions, for example, aluminum extrusions assembled with appropriate fasteners. For example, in one aspect, horizontal and vertical support members 62 may comprise aluminum "T-slot" framing extrusions, for instance, T-slot aluminum extrusions provided by 80/20 Inc. of Columbia City, Indiana (and at their website "8020.net"), or their equivalent. For example, horizontal and vertical support members 62 may comprise one or more of the following serial numbers for extrusions provided by 80/20 Inc.: 80/20 T-slot 1030-S, 80/20 T-slot 1004-S, 80/20 T-slot 1002-S, 80/20 T-slot 1003-S, 80/20 T-slot 1010-S, as described in 80/20 Inc. Product Catalog 23, which is include by reference herein, though other structural extrusions or channel and associated hardware may be used.

As also shown in FIGS. 15 and 16, enclosure 12 may be provided with handles or similar hardware 63 and 65 to facilitate handling and transport of prop 10. Handles 63 and 65 may be compatible with the support members 62, for example, handles 63 and 65 may be adapted to engage T-slot aluminum extrusions.

Elongated horizontal and vertical support members 62 may comprise any appropriate material, for example, a metal, a plastic, or even a wood. However, since in one aspect enclosure 12 will be repeatedly exposed to heat, in one aspect, horizontal and vertical support members 62 may be at least fire-retardant, but preferably, heat resistant. Accordingly, in one aspect, horizontal and vertical support members 62 may be made from a heat-resistant metal, such as, an aluminum, a steel, a stainless steel, or a titanium. In other aspects, horizontal and vertical support members 62 may be made from a heat-resistant plastic, such as, a polytetrafluoroethylene (PTFE), for example, a Teflon® PTFE provided by Chemours, a spin-off from DuPont, or its equivalent; or a thermoset plastic, for example, a polyimide, for instance, Vespel® polyimide provided by DuPont, or its equivalent; or a polyamide-imide, for instance, Torlon® polyamide-mide provided by Solvay Specialty Polymers, or its equivalent.

As also shown in FIGS. 15 and 16, front wall 14, rear wall 16, right side wall 18, and left side wall 20 may be provided in appropriate shapes and widths depending upon the size and loading of enclosure 14. For example, in one aspect, front wall 14, rear wall 16, right-side wall 18, and left-side wall 20, and may have dimensions, for example, lengths and widths, ranging from 3 inches to 10 feet, but typically, have widths or heights ranging from 6 inches to 36 inches, for example, 12 to 30 inches. In one aspect, front wall 14, rear wall 16, right-side wall 18, and left-side wall 20 may have thicknesses, ranging from 0.0625 inches to 0.5 inches, but typically, have thicknesses ranging from 0.125 inches to 0.375 inches, for example, 0.25 inches.

In one aspect, one or more of front wall 14, rear wall 16, right-side wall 18, and left-side wall 20 24 may typically be transparent, or at least translucent, to allow a user to view into enclosure 12, for example, to view the space or room behind the wall and view at least a portion of partition assembly 42. Accordingly, in one aspect, front wall 14, rear wall 16, right-side wall 18, and left-side wall 20, and bottom panel 24 may be made from any one of the transparent materials disclosed herein, for example, a pyroceram or its equivalent. In one aspect, one or more of front wall 14, rear wall 16, right side wall 18, left side wall 20, and bottom panel 24 may be made from any appropriate material, for example, a metal, a plastic, or even a wood, such as, any one or more of the heat-resistant metals or heat-resistant metals or plastics disclosed herein, for example, aluminum.

As also shown in FIGS. 15 and 16, front wall 14, rear wall 16, right-side wall 18, and left-side wall 20 may have one or more openings or apertures 26, 28, and, 30 having hinged aperture covers 32, 34, and 36, respectively. Aperture covers, or doors windows, 32, 34, 36, and 40 may be movably mounted, for example, hinged to respect front wall 14, rear wall 16, right side wall 18, and left side wall 20 by conventional means, for example, by mechanical fasteners, such as one or more hinges 37, as shown. According to aspects of the invention, one or more of aperture covers 32, 34, 36, and 40 may be open or closed, as desired, to effect a desire air flow into (or out of) enclosure 12, for example, to demonstrate the effect of a change in air supply to a source of fire in enclosure 12. In one aspect, aperture covers or doors 32, 34, 36, and 40 may be open or closed manually, for example, by a trainer or trainee manually opening or closing doors 32, 34, 36, and 40 by grasping and moving a handle or knob 39 mounted on doors 32, 34, 36, and 40. In other aspects of the invention, aperture covers or doors 32, 34, 36, and 40 may be open or closed automatedly, for example, via one or more linkages mounted to doors 32, 34, 36, and 40 and moved by a motor or transducer, for example, a motor, a pneumatic actuator, or a displacement transducer, such as, a liner displacement transducer, operated by a trainer or by a trainer via a controller, for example, programmable logic controller or the like.

In one aspect, aperture covers, or doors or windows, 32, 34, 36, and 40 may be designed to automatically open and release an over-pressure during certain fire behavior phenomena (such as, a "backdraft") within prop 10. For example, in one aspect, aperture covers, or doors windows, 32, 34, 36, and 40, may include spring-loaded hinges or counterweighs selected to allow the cover to deflect under a predefined load on a cover, for example, a predefined pressure load on the internal surface of a cover. In one aspect, a cover may be designed to have a predefined weight where the cover deflects under a predefined load. In another aspect, pressure sensors may be used to detect a pressure within prop 10. A pressures sensor may be coupled to a cover opening mechanism that activates and deflects the cover when a predetermined pressure is detected by the pressure sensor. Other methods for releasing an over pressure within prop 10 will be apparent to those of skill in the art.

According to one aspect of the invention, the walls 14, 16, 18, and 20, top 22, and bottom 24 and the support members 62, among others, allow for thermal expansion and/or contraction of the components during use. In one aspect, this construction is referred to as "floating panel construction." Accordingly, in one aspect, the walls 14, 16, 18, and 20, top 22, and bottom 24 and the support members 62 are designed and dimensioned with sufficient tolerances or clearances between elements, for example, in the horizontal planes (for example, the X-Y plane) and in the vertical direction (for example, the Z direction) to allow for thermal expansion and contraction without distortion or the creation of undesirable gaps or openings in enclosure 12.

Figure 17:
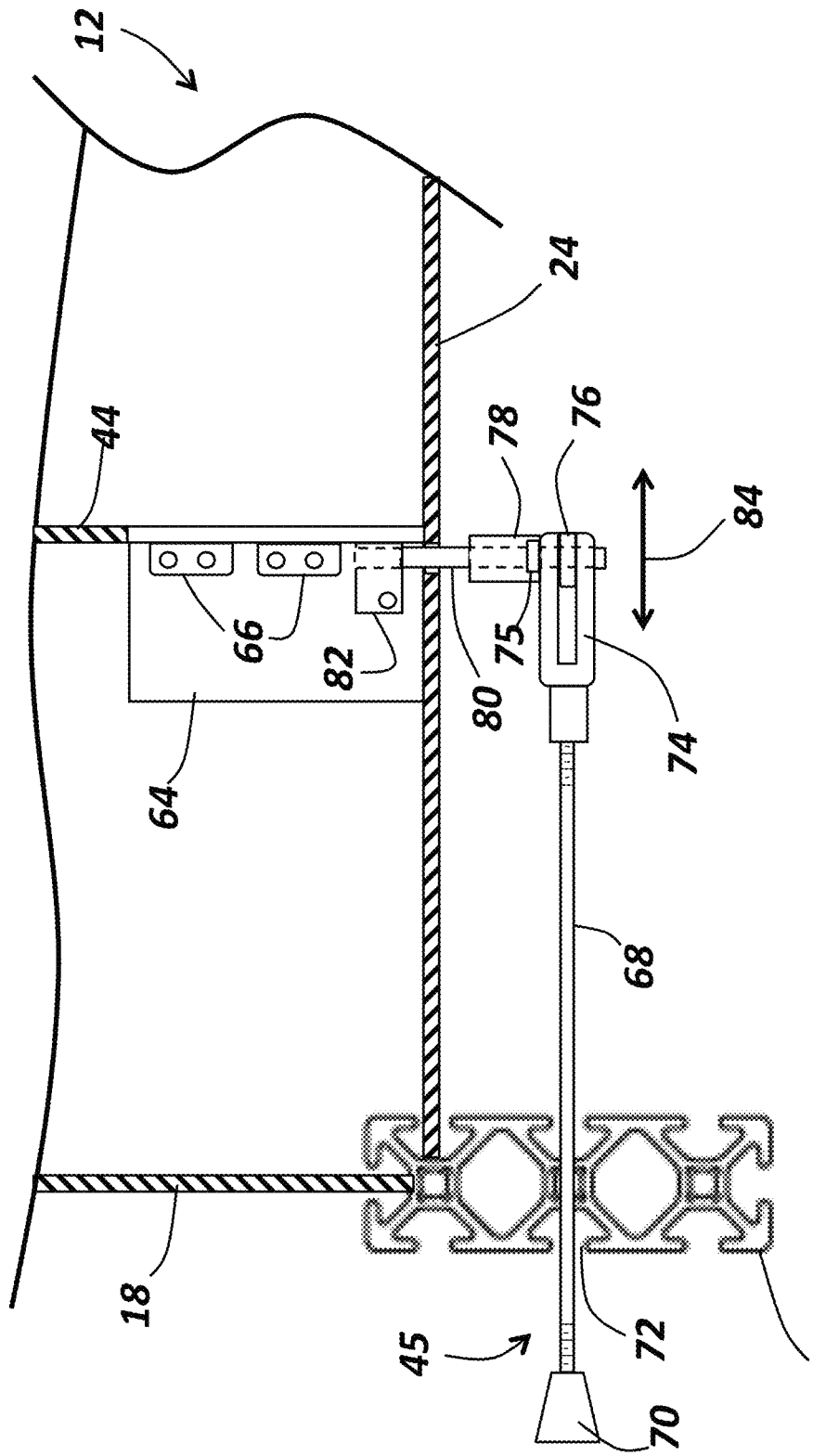
FIG. 17 is cross sectional view of a portion of the enclosure shown in FIG. 15 illustrating one means by which one control rod may be used to manipulate an internal door in the enclosure according to an aspect of the invention.

In one aspect of the invention, as shown in FIGS. 1-8, enclosure 12 of prop 10 includes one or more control rods 43, 45, and 47 mounted for translation and/or rotation within enclosure 12. In one aspect, one or more control rods 43, 45, and 47 may extend out of enclosure 12 and be accessible to a user, for example, a trainer or trainee. In one aspect, one or more control rods 43, 45, and 47 may not extend out of enclosure 12, but may be positioned within enclosure 12 or beneath bottom panel 24, and accessible to control or manipulation mechanisms, for example, automated linkages and/or transducers, positioned within enclosure 12 and/or beneath bottom panel 24 of enclosure 12. FIG. 17 is illustrates one means by which one or more of control rods 43, 45, or 47 may be used manipulate an internal door in enclosure 12.

Figure 18:
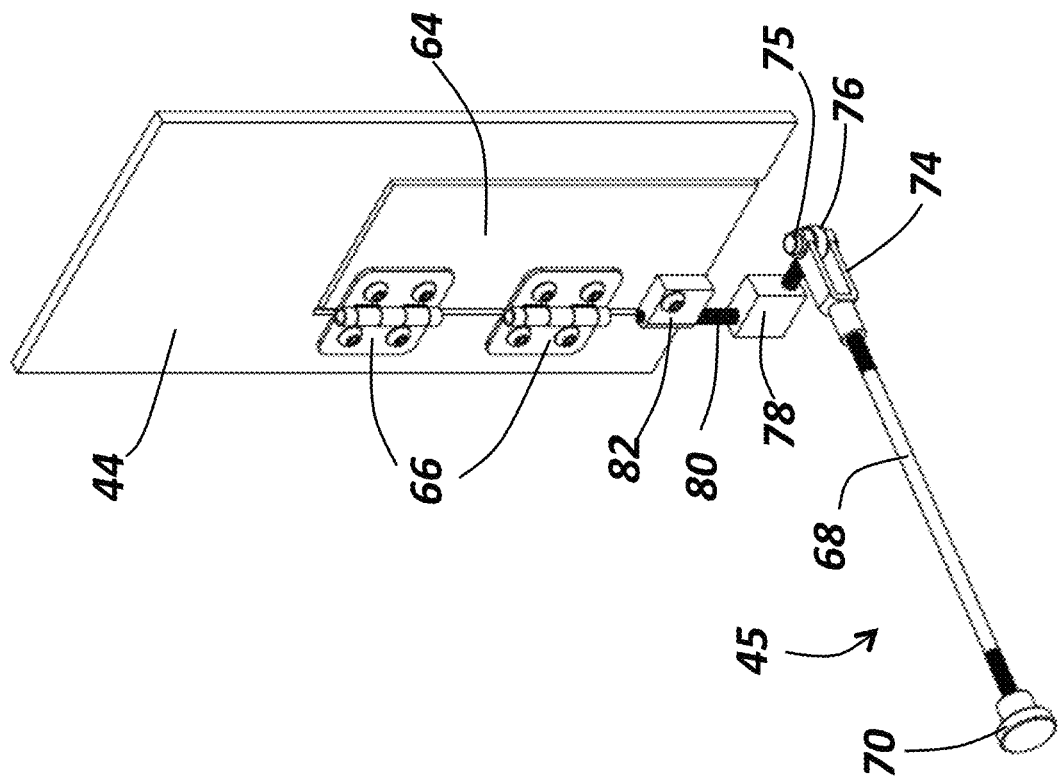
FIG. 18 is a perspective view of an isolated assembly of a door and a control rod shown in FIG. 17 with the door in a closed position.

FIG. 17 is cross sectional view of a portion of enclosure 12, partially in cross section, illustrating one means by which one or more of controls rods 43, 45, or 47 may be used manipulate an internal door 64. Internal door 64 may be mounted by hinges 66 to a wall 44 of partition assembly 42 in enclosure 12. Though control rods 43, 45, and 47 may each be configured as shown in FIG. 17, only control rod 45 is shown in FIG. 17. FIG. 18 is a perspective view of an isolated assembly of door 64 and control rod 45 shown in FIG. 17 with the door 64 in a closed position and FIG. 19 is a perspective view of the isolated assembly shown in FIG. 18 with the door 64 in an open position.

Figure 19:
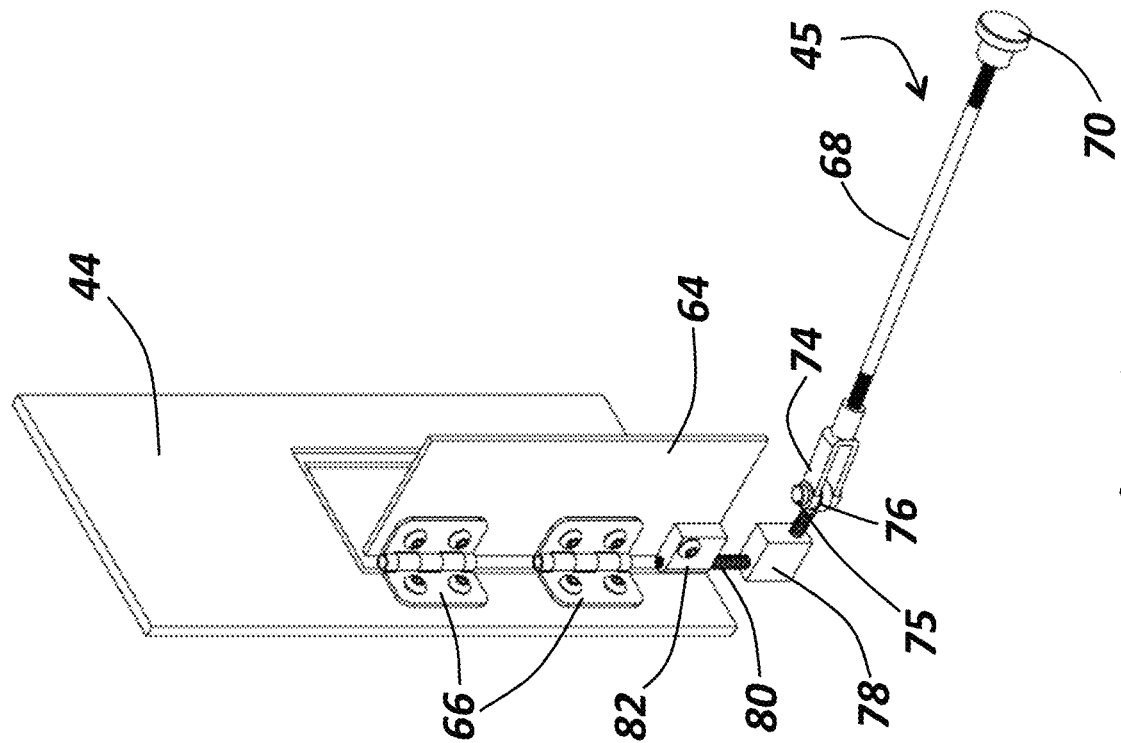
FIG. 19 is a perspective view of the isolated assembly shown in FIG. 18 with the door in an open position.

As shown in FIGS. 17, 18, and 19, in one aspect, control rod 45 (or rods 43 and 47) may comprise an elongated member 68, which may have a knob or projection 70 to facilitate handling, that extends through a hole or slot 72 in a horizontal support member 62. Though it is envisioned that control rod 45 may be operatively connected to door 64 via a broad range of mechanisms and/or hardware and effect the desired function, in the aspect shown in FIGS. 17, 18, and 19 control rod 45 engages door 64 with one series of appropriate hardware. As shown in FIGS. 17, 18, and 19, in one aspect, elongated member 68 of control rod 45 is mounted to, for example, threaded into, a forked clevis or yoke 74, which rotatably engages a threaded eyebolt 76 via pin 75 in clevis 74. Eyebolt 76 is threaded into a block 78 into which a threaded rod 80 is positioned. Threaded rod 80 extends into and engages door mounting block 82 mounted to door 64, for example, by one or more threaded fasteners. According to this aspect of the invention, with the translation of control rod 45 back or forth, as indicated by double arrow 84 in FIG. 17, door 64, or any door similarly engaged by a control rod and mounted in partition assembly 42 of enclosure 12, can be opened and closed.

FIG. 20 is a detailed view of rear wall 16 shown in FIG. 5 as identified by Detail 20 shown in FIG. 5. FIG. 20 illustrates one means for introducing a fluid, for example, air, into prop 10 according to one aspect of the invention. As shown in FIG. 20, in one aspect, wall 16 may include a hole, port, or orifice 84 (shown in phantom in FIG. 20) through which a fluid may be introduced to prop 10, for example, to demonstrate the effect of the introduction of an oxygen-containing fluid, such as, air, or the effect of a fire-suppressing fluid, for example, water, to an active fire present in prop 10. Though FIG. 20 is associated with rear wall 16 of prop 10, it is envisioned that hole 84 may be placed in one or more of front wall 14, rear wall 16, right-side wall 18, left-side wall 20, top 22, and/or bottom 24 according aspects of the invention.

As shown in FIG. 20, in one aspect, hole 84 may be provided with a cover 86, for example, a readily moveable cover 86 that permits a user to displace or remove cover 86 to expose and permit access to hole 84. In one aspect, cover 86 may include some form of sealing device or mechanism to minimize or prevent leakage or introduction of fluid, such as, air, through hole 84 and into prop 10. As shown, in one aspect, cover 86 may comprise a plate, for example, a circular or polygonal plate, mounted for rotation or displacement with respect to wall 16. For example, in one aspect, cover 86 may be mounted by a fastener 88, such as, a rivet, bolt, or screw, to side wall 16, where cover 86 may be rotatably displaced about fastener 88 to expose hole 84. FIG. 21 is detailed view similar to FIG. 20 where cover 86 has been rotatably displaced, as indicated by arrow 90, from the position of cover 86 shown in FIG. 20 to expose hole 84. In one aspect, cover 86 may include a handle or pin 92 positioned and sized to facilitate displacement of cover 86, for example, manual displacement by a trainer or trainee using prop 10.

Though it is envisioned that any conventional means of introducing a fluid may be practiced to introduce a fluid through hole 84, for example, by coupling hole 84 to a source compressed air, coupling hole 84 to a source of pressured water, or by simply blowing through hole 84, FIG. 22 illustrates one example by which a fluid may be introduced to prop 10 through hole 84.

FIG. 22 is a cross sectional view of wall 16 having hole 84 shown in FIG. 21 as viewed along view line 22 in FIG. 21. In addition, FIG. 22 illustrates the presence of a fluid introduction conduit 94, for example, a tube, a pipe, or a straw, that is inserted into hole 84 and may be used to introduce a fluid through hole 84, for example, by blowing through conduit 94. In one aspect, conduit 94 may be operatively connected to a source of fluid, for example a source of compressed air or a source of pressurized water. The flow of fluid from conduit 94 into the interior of prop 10 is represented by the arrow 93 shown in FIG. 22. As also shown in FIG. 22, hole 84 may be provided by the inside diameter of a sleeve or grommet 96 mounted in wall 16. Though sleeve 96 may typically be circular in cross section sleeve 96 may have a non-circular cross section, such as, a polygonal cross section. Sleeve 96 may be made from any conventional material, but may typically be made of a heat resistant material, for example, any one of the heat resistant metals or heat resistant plastics disclosed herein.

Hole 84 may have an inside dimension or diameter ranging from 0.125 inches to 1.0 inch, for example, depending upon the size of prop 10, but typically hole 84 has an inside dimension ranging from 0.25 inches to 0.375 inches.

Though conduit 94 may typically be circular in cross section and have an outside diameter compatible with the inside diameter of hole 84, conduit 94 may have a non-circular cross section, such as, a polygonal cross section. Conduit 94 may be made from any conventional material, but may typically be made of a heat resistant material, for example, any one of the heat resistant metals or heat resistant plastics disclosed herein.

Figure 23:
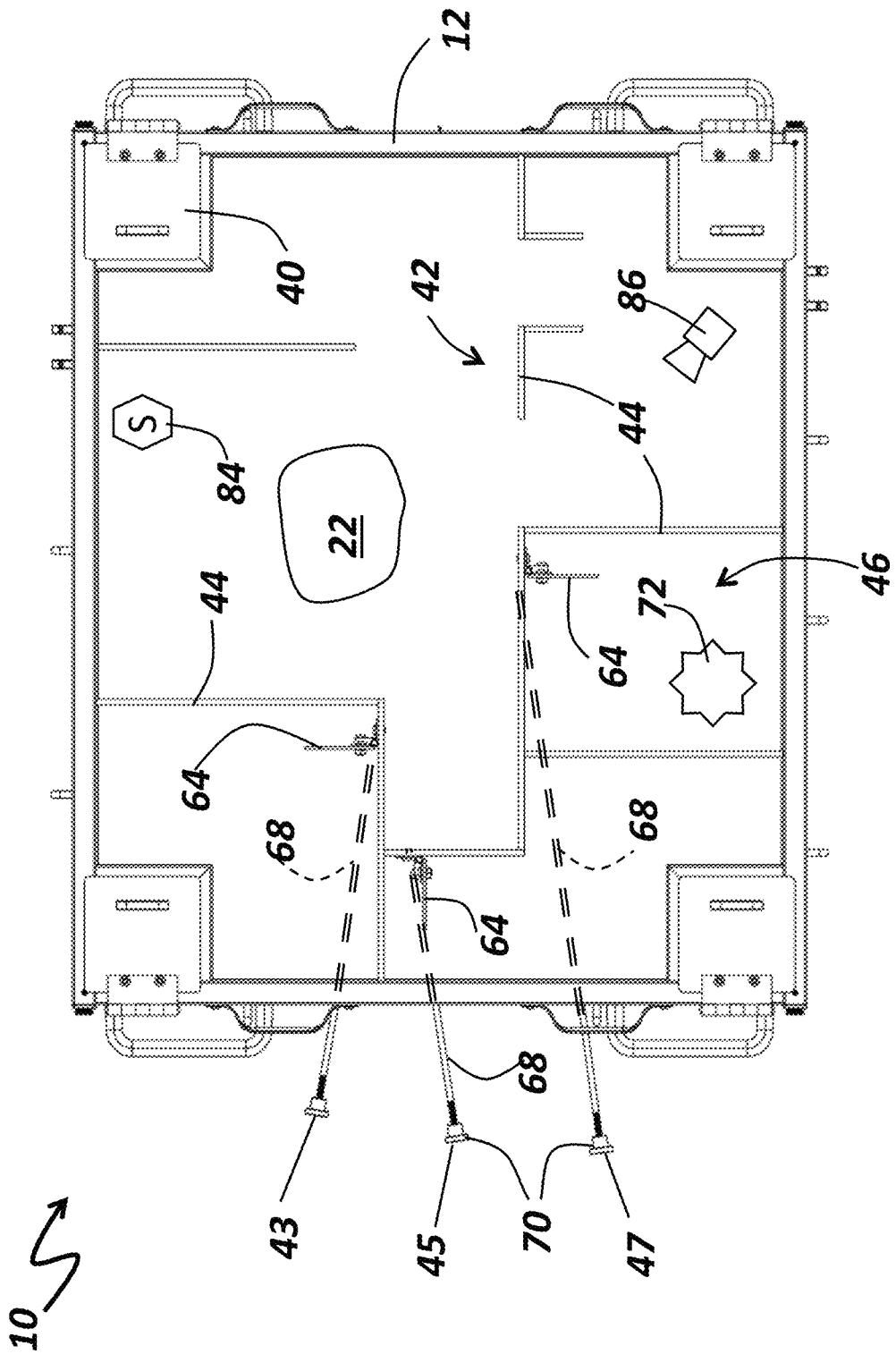
FIGS. 23 and 24 are top plan views of the prop shown in FIGS. 1 through 17 illustrating a method of using the prop according to one aspect of the invention.
Figure 24:
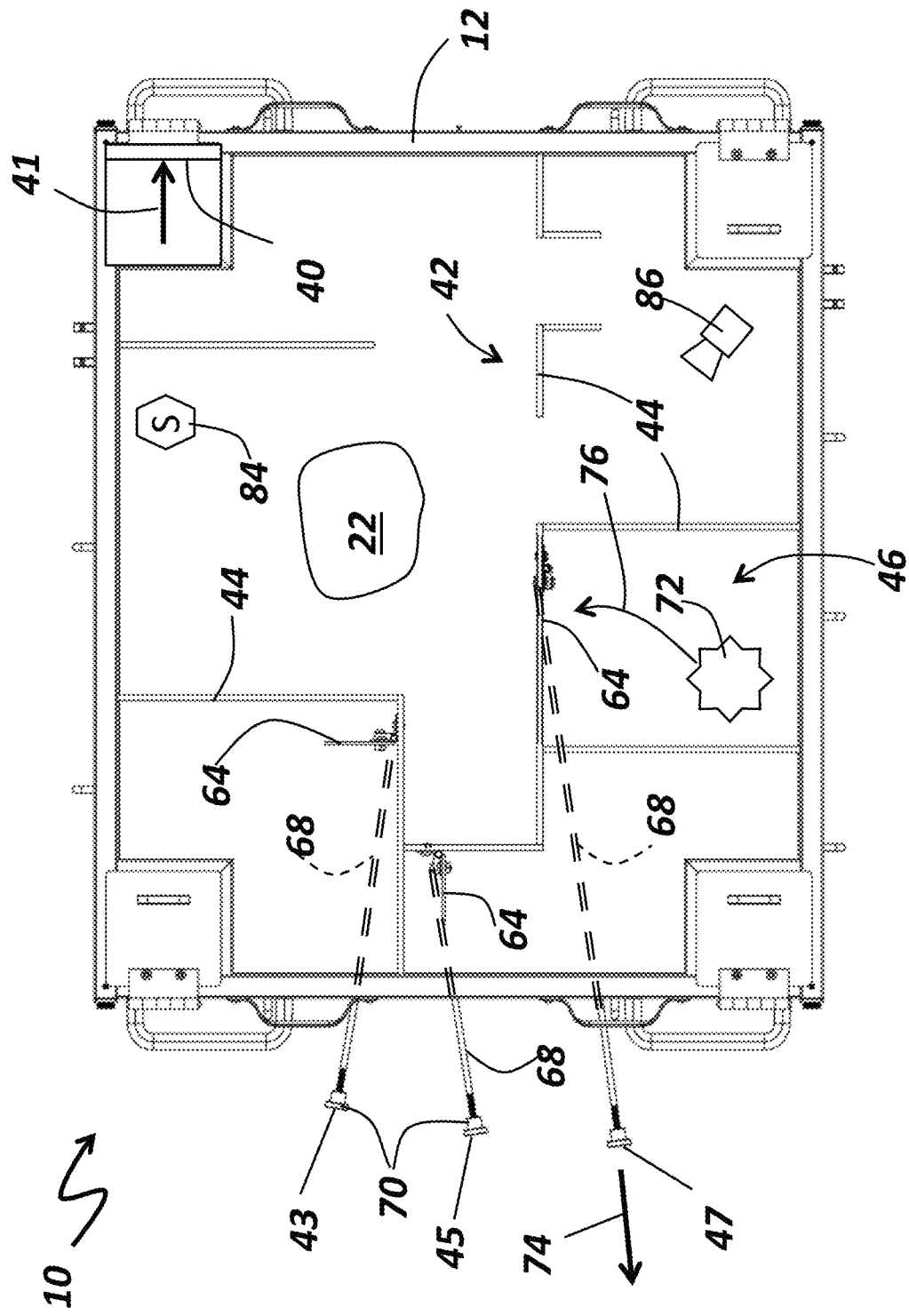

FIGS. 23 and 24 illustrate methods of using prop 10 according to one aspect of the invention. FIG. 23 is a top plan view of prop 10 shown and described with respect to FIGS. 1 through 22. Specifically, FIG. 23 shows prop 10 having an enclosure 12, a transparent top panel 22 (only a portion of which is shown in FIG. 23), an inner partition assembly 42 having walls 44 defining a volume or room 46. Though not shown in FIG. 23 or 24, one of more of the front wall 14, rear wall 16, right side wall 18, left side wall 20, and bottom panel 24 may be transparent to allow the user to view into enclosure 12. The control rods 43, 45, and 47 having elongated element 68 extend into prop 10 and are operatively connected to an internal door 64 pivotally mounted to a wall 44 of partition assembly 42. As disclosed herein, according to an aspect of the invention, each of control rods 43, 45, and 47 are operatively connected to a door 64 whereby withdrawing, inserting, or rotating control rod 43, 45, and 47 opens or closes door 64. Doors 64 are in an opened position in FIG. 23 and are in a closed position shown in FIG. 24. As also shown in FIG. 40, enclosure 12 includes an aperture cover 40 pivotally mounted to enclosure 12.

According to aspects of the invention, a flammable material may be positioned within prop 10 ignited and then the progress of the flame and/or smoke emitted by the ignited flammable material may be observed by, for example, a firefighter or first responder trainee through the transparent top panel 22 of prop 10. In the aspect shown in FIG. 23, the flammable (or inflammable or combustible) material is ignited in room 46 of enclosure 12 producing a flame 72. As known in the art, a "flammable" material is a material having flash point below 37.8 degrees C. (100 degrees F.); and a "combustible" material is a material having a flash point higher than 37.8 degrees C. (100 degrees F.) and below 93.3 degrees C. (200 degrees F.). According to aspects of the invention, the material introduced to prop 10 for ignition may be a flammable material and/or a combustible material.

According to aspects of the invention, the flammable material may be a flammable solid, such as, wood, paper, or other combustible material, and/or a flammable fluid, such, as liquid gasoline, gaseous propane, natural gas (primarily methane), kerosene, an alcohol (such as, methanol, ethanol, or a denatured alcohol), or the like. In one aspect, the flammable material may be positioned in a container in prop 10, for example, a container having an open top, such as, a tray or can, and then ignited. The source of ignition may be, for example, a match or a lighter, for example, long-reach lighter. In one aspect, the flammable material may be ignited automatedly, for example, using am electric igniter or spark generator (for example, a "sparker"). The automated igniter may be energized locally or remotely, for example, operatively connected and controlled locally or remotely by a control system.

FIG. 24 is a top plan view of prop 10 shown in FIG. 23 as the flame 72 advances or stagnates in room 46. As also shown in FIG. 24, according to one aspect of the invention, an operator, for example, a firefighter trainer or a first responder trainer, may manipulate one or more of control rods 43, 45, and/or 47 to open or close one or more doors 64, open or close one or more of the side wall doors 32, 34, and/or 36 in the sides of prop 10, and/or open or close one or more of the aperture covers 40 in the top of prop 10 and observe the effect upon the progression and/or stagnation of flame 72.

In the aspect shown in FIG. 24, an operator extracts control rod 47 from enclosure 12, as indicated by arrow 74, and thereby closes door 64 preventing smoke and/or fire from flame 72 to flow out of room 46, as indicated by arrow 76. According to one aspect, one or more the aperture covers 40 in the top of prop 10 may also be opened, for example, manually by an operator, as indicated by arrow 41 and the further progress of smoke and/or fire from flame 72 may be observed through the transparent top panel 22.

In one aspect, the opening or closing of one or more doors 64 and/or the opening or closing of one or more of the doors 32, 34, 36, and/or 38 in prop 10 may be used to vary and/or control the flow path and/or flow rate of air to the flame 72. In addition, or as an alternative, the opening or closing of one or more doors 64 and/or the opening or closing of one or more of doors 32, 34, 36 and/or 38 in prop 10 may be used to vary and/or control the flow path and/or flow rate of exhaust gases (for example, smoke) from flame 72. According to aspects of the invention, the variation or control of the flow paths and/or flow rates of air to and/or exhaust gas from flame 72 may enhance the trainees understanding and appreciation for the effect these fluid flows may have upon fire progression and/or fire suppression during an actual fire incident.

As disclosed herein, any one of the doors 64, covers 32, 36, 38, and 40 may be manually manipulated and/or manipulated by automated means, for example, by remote actuation and control.

In one aspect, prop 10 may be supplemented with instrumentation, controllers, and or sensors to further enhance the operability and the training experience. For example, in one aspect, prop 10 may be supplemented with one or more sensors 84 as shown in FIGS. 23 and 24, such as, sensors configured to detect at least one ambient condition, such as, temperature (for example, thermocouples), humidity, chemical concentration, or explosion limits, among others. Sensors 84 may be adapted to generate an electrical signal corresponding to the detected ambient condition, and forward that electrical signal (by wire or wirelessly) to a receiver configured to receive the electric signals. The receiver may be operatively connected to a digital storage device adapted to store the electrical signals for immediate or future display.

In aspect, image recording devices or cameras, such as, video and/or thermal imaging devices may be positioned in prop 10. For example, in one aspect, prop 10 may be supplemented with one or more image recording devices or cameras 86 as shown in FIGS. 23 and 24, such as, devices configured to detect images, such as, infrared (heat) or visual images, either as still images and/or video images. Image recording devices 86 may be adapted to generate an electrical signal corresponding to the detected images, and forward that electrical signal (by wire or wirelessly) to a receiver configured to receive the electric signals. The receiver may operatively connect to a digital storage device adapted to store the electrical signals for immediate or future display.

In one aspect, prop 10 may be configured to communicate with a monitoring system, for example, the Temperature Monitoring System marketed by Flashpoint Fire Equipment, Inc. of Troy, New York, and disclosed in pending U.S. application Ser. No. 16/377,438 filed on Apr. 8, 2019, the disclosure of which is included by reference herein.

FIGS. 25 and 26 illustrate further aspects of the invention. FIG. 25 is a perspective view of a prop assembly 100 having multiple props 10 as disclosed herein stacked one on top of the other. According to aspects of the invention two or more props 10 may be provided in prop assembly 100 where props 10 may be interconnected by appropriate hardware, for example, conventional fasteners used with T-slot aluminum extrusions may be used to assemble two or more props 10 into prop assembly 100. According to aspects of the invention, 3 or more props 10 may be stacked and interconnected to provide prop assembly 100. It is also envisioned that 5 or more props 10, or 10 or more props 10, may be stacked and interconnected to provide prop assembly 100. As also shown in FIG. 25 the size or shape of props 10 in prop assembly 100 may vary.

FIG. 26 are a perspective view of a prop assembly no having multiple props 10 as disclosed herein assembled in a horizontal array, with props 10 assembled to adjacent to other props 10. According to aspects of the invention two or more props 10 may be provided in a prop assembly no where props 10 may be interconnected by appropriate hardware, for example, conventional fasteners used with T-slot aluminum extrusions may be used to assemble two or more props 10 into prop assembly no. According to aspects of the invention, 3 or more props 10 may be arranged and interconnected to provide prop assembly no. It is also envisioned that 5 or more props 10, or 10 or more props 10, may be assembled and interconnected to provide prop assembly 110. As also shown in FIG. 26 the size or shape of props 10 in prop assembly 110 may vary.

It is also envisioned, that three or more props 10 may be assembled both in a stack as shown in FIG. 25 and in a horizontal array as shown in FIG. 26 to provide a three-dimensional assembly of props 10.

As disclosed herein, props, devices, assemblies, and methods are provided to facilitate and enhance training in the dynamic behavior of fire and smoke in as a structure, and can illustrate the effects of fire suppression techniques. Though aspects of the invention can be useful in training firefighters and other first responders, the trainees that may benefit from access to training using the props and methods disclosed herein are limitless. Aspects of the invention provide the unique opportunity to observe fire behavior in table-top, scale model structures from above, with, or without viewing from a side, or even from below. In addition, aspects of the invention, allow trainer and trainee to observe and compare the effectiveness of different fire suppression techniques and to observe the effect of changes in air input and/or fire suppressing fluids to the behavior of the fire.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or groups thereof.

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A table-top fire training prop comprising:
   a heat-resistant enclosure having an open top, a closed aluminum bottom, aluminum sides, and aluminum support members;
   at least one heat-resistant internal partition positioned within the heat-resistant enclosure and defining a plurality of internal volumes within the heat-resistant enclosure;
   a heat-resistant transparent top panel positioned on the open top of the heat-resistant enclosure;
   at least one side aperture and a side aperture cover in at least one of the sides of the heat-resistant enclosure; and
   at least one panel aperture having an aperture cover in the at least one heat-resistant internal panel;
   wherein the sides, the transparent top panel, the bottom, and the support members comprise floating panel construction, wherein the sides, the transparent top panel, the bottom, and the support members are designed and dimensioned with sufficient clearances to allow for thermal expansion and contraction without thermal distortion of the enclosure; and
   wherein, when a source of live fire is introduced to the heat-resistant enclosure, a flow of the live fire in the heat-resistant enclosure can be monitored by a user through the heat-resistant transparent top panel.

2. The training prop as recited in claim 1, wherein the at least one heat-resistant internal partition positioned within the heat-resistant enclosure and defining the plurality of internal volumes within the heat-resistant enclosure comprises a partition assembly having a plurality of heat-resistant panels positioned within the heat-resistant enclosure and defining the plurality of internal volumes within the heat-resistant enclosure.

3. The training prop as recited in claim 1, wherein the training prop further comprise at least one control rod operatively connected to the at least one panel aperture cover in the at least one heat-resistant internal panel.

4. The training prop as recited in claim 1, wherein the source of live fire comprises one of an ignited flammable material and an ignited combustible material.

5. The training prop as recited in claim 4, wherein the ignited flammable material comprises one of an ignited wood and an ignited paper.

6. The training prop as recited in claim 5, wherein the ignited combustible material comprises one of ignited gasoline, ignited propane, ignited natural gas, ignited methane, ignited kerosene, and an ignited alcohol.

7. The training prop as recited in claim 1, wherein the aperture cover of the at least one panel aperture is adapted to be manipulated by the user.

8. The training prop as recited in claim 7, wherein the aperture cover of the at least one panel aperture comprises a door.

9. The training prop as recited in claim 7, wherein the aperture cover of the at least one panel aperture is adapted to be manipulated by the user with a control rod.

10. The training prop as recited in claim 1, wherein the training prop comprises a scale model of a floor plan of a structure and wherein the plurality of internal volumes within the heat-resistant enclosure comprises a plurality of horizontally adjacent internal volumes of the floor plan.

11. A training method comprising
    providing a training prop comprising:
    a heat-resistant enclosure having an open top, a closed aluminum bottom, aluminum sides, and aluminum support members;
    a heat-resistant transparent top panel positioned on the open top of the heat-resistant enclosure;

at least one heat-resistant internal partition positioned within the enclosure and defining a plurality of internal volumes within the enclosure; and at least one wall aperture having an aperture cover in the at least one heat-resistant internal partition;

wherein the sides, the transparent top panel, the bottom, and the support members comprise floating panel construction, wherein the sides, the transparent top panel, the bottom, and the support members are designed and dimensioned with sufficient clearances to allow for thermal expansion and contraction without thermal distortion of the enclosure; and introducing a source of live fire to the heat-resistant enclosure; and allowing a trainee to monitor a flow of the live fire in the enclosure through the heat-resistant transparent top panel.

12. The method as recited in claim 11, wherein the method further comprises manipulating a position of the aperture cover of the at least one wall aperture.

13. The method as recited in claim 12, wherein manipulating the position of the aperture cover of the at least one wall aperture comprises one of opening and closing the aperture cover.

14. The method as recited in claim 11, wherein the training prop further comprises at least one control rod operatively connected to the aperture cover of at least one wall aperture, and wherein manipulating the position of the aperture cover of the at least one wall aperture comprises manipulating the at least one control rod.

15. The method as recited in claim 11, wherein the method further comprises introducing a flow of gas to the training prop.

16. The method as recited in claim 15, wherein at least one of the aluminum sides of the heat-resistant enclosure comprises a hole and a displaceable cover mounted over the hole, and wherein introducing the flow gas to the training prop comprises displacing the cover from the hole and introducing the flow gas through the hole and into the training prop.

17. The method as recited in claim 16, wherein introducing the flow of gas to the training prop further comprises inserting a conduit through the hole and passing the flow of gas through the conduit.

18. The method as recited in claim 11, wherein the at least one heat-resistant internal partition positioned within the heat-resistant enclosure comprises a first partition assembly defining a first plurality of volumes, and wherein the method further comprises replacing the first partition assembly defining the first plurality of volumes with a second partition assembly defining a second plurality of volumes, different from the first plurality of volumes.

19. The method as recited in claim 18, wherein the method further comprises allowing the trainee to monitor a flow of the live fire in the heat-resistant enclosure with the second partition assembly and comparing the flow of live fire with the second partition assembly with the flow of live fire with the first partition assembly.

20. A table-top fire training prop, the training prop comprising:

a heat-resistant enclosure having an open top, a closed aluminum bottom, aluminum sides, and aluminum support members;

a partition assembly positioned within the heat-resistant enclosure, the partition assembly having a plurality of partitions defining a plurality of internal volumes within the heat-resistant enclosure;

a heat-resistant transparent top panel positioned on the open top of the heat-resistant enclosure;

at least one side aperture and a side aperture cover in at least one of the sides of the heat-resistant enclosure;

at least one door pivotally mounted to one of the partitions of the partition assembly; and at least one control rod operatively connected to the at least one door and adapted to open and close the at least one door;

wherein the sides, the transparent top panel, the bottom, and the support members comprise floating panel construction, wherein the sides, the transparent top panel, the bottom, and the support members are designed and dimensioned with sufficient clearances to allow for thermal expansion and contraction without thermal distortion of the enclosure; and wherein, when a source of live fire is introduced to the heat-resistant enclosure, a flow of the live fire in the heat-resistant enclosure can be monitored by a user through the heat-resistant transparent top panel and the flow of live fire can be manipulated by the user by opening or closing the at least one door with the at least one control rod.

* * * * *